(12) United States Patent
Lam Nguyen

(10) Patent No.: US 10,966,439 B2
(45) Date of Patent: *Apr. 6, 2021

(54) CONCENTRATED FRUIT JUICE POWDER AND METHOD FOR PREPARING THE SAME USING A NON-LINEAR SCREW PRESS JUICER AND CONVECTION CURRENT FREEZE DRYING APPARATUS

(71) Applicant: VINAMIT USA LLC, Tigard, OR (US)

(72) Inventor: Vien Lam Nguyen, Ho Chi Minh (VN)

(73) Assignee: VINAMIT USA LLC, Tigard, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,369

(22) Filed: Jul. 30, 2020

(65) Prior Publication Data

US 2020/0367532 A1 Nov. 26, 2020

Related U.S. Application Data

(63) Continuation-in-part of application No. 16/258,639, filed on Jan. 27, 2019.

(51) Int. Cl.
| | |
|---|---|
| *A23L 2/14* | (2006.01) |
| *A23L 2/04* | (2006.01) |
| *A23L 2/06* | (2006.01) |
| *A23L 2/60* | (2006.01) |
| *A23L 33/135* | (2016.01) |

(Continued)

(52) U.S. Cl.
CPC .................... *A23L 2/14* (2013.01); *A23L 2/04* (2013.01); *A23L 2/06* (2013.01); *A23L 2/60* (2013.01); *A23L 29/30* (2016.08); *A23L 33/135* (2016.08); *A23N 1/003* (2013.01); *A23N 1/02* (2013.01); *A23P 30/10* (2016.08); *A23V 2002/00* (2013.01); *A23Y 2220/00* (2013.01); *A23Y 2240/00* (2013.01); *A23Y 2300/00* (2013.01)

(58) Field of Classification Search
CPC .... F26B 5/06; F26B 5/04; F26B 5/044; F26B 5/042; A61J 1/1468; A23N 1/003; A23N 1/02; A23V 2002/00; A23V 2220/00; A23V 2240/00; A23V 2300/00; A23L 12/14; A23L 29/30; A23L 30/10; A23L 33/135; A23L 2/04; A23L 2/06; A23L 2/60
USPC .............................................. 34/92, 284, 296
See application file for complete search history.

(56) References Cited

U.S. PATENT DOCUMENTS 3,270,434 A * 9/1966 Ulrich Hackenberg .. F26B 5/06
  34/92
4,177,577 A * 12/1979 Bird .......................... F26B 5/06
  34/92

(Continued)

*Primary Examiner* — Stephen M Gravini

(57) ABSTRACT

A concentrated fruit juice powder obtained by a convection current vacuum freeze drying process that includes: selecting and preparing fruits by predetermined quality guideline; extracting fruit juice by inserting the fruits into a screw press juicing apparatus having a precutter and a screw press whose body surface varies non-linearly, which is configured to achieve a maximum extraction efficiency; adding probiotics into the extracted fruit juice; freezing the fruit juice mixed with the probiotics in molds using an individual quick freezer (IQF) to obtain frozen fruit juice blocks; and vacuum freezing the frozen fruit juice blocks using a convection current vacuum freeze drying apparatus.

20 Claims, 8 Drawing Sheets

(51) Int. Cl.
*A23P 30/10* (2016.01)
*A23N 1/02* (2006.01)
*A23N 1/00* (2006.01)
*A23L 29/30* (2016.01)

(56) References Cited

U.S. PATENT DOCUMENTS

| | | | | |
|---|---|---|---|---|
| 5,298,275 A * | 3/1994 | Balasingham | A23L 2/02 | 426/333 |
| 5,665,413 A * | 9/1997 | Rossiter | A23G 9/305 | 426/384 |
| 5,884,413 A * | 3/1999 | Anger | F26B 5/06 | 34/92 |
| 6,497,911 B1 * | 12/2002 | Hansen | A23F 3/32 | 426/285 |
| 6,877,249 B1 * | 4/2005 | Greenwood | A61P 1/10 | 34/361 |
| 6,920,701 B2 * | 7/2005 | Haseley | F26B 5/06 | 34/92 |
| 8,021,706 B2 * | 9/2011 | Bartkowska | A23G 9/46 | 426/565 |
| 8,685,473 B2 * | 4/2014 | McArthur | A61K 36/22 | 424/777 |
| 8,793,895 B2 * | 8/2014 | Gasteyer, III | A61P 37/04 | 34/287 |
| 8,793,896 B2 * | 8/2014 | Patel | G01N 21/68 | 34/290 |
| 8,904,664 B2 * | 12/2014 | Pringle | A61F 2/02 | 34/105 |
| 8,966,782 B2 * | 3/2015 | Kuu | F25D 17/02 | 34/287 |
| 8,984,763 B2 * | 3/2015 | Savarese | F26B 17/023 | 34/266 |
| 9,003,676 B2 * | 4/2015 | Yarborough | A61M 5/002 | 34/287 |
| 9,121,637 B2 * | 9/2015 | Ling | F26B 5/06 | |
| 9,528,761 B2 * | 12/2016 | Kuu | F25D 17/02 | |
| 9,739,532 B2 * | 8/2017 | Baugh | F26B 5/06 | |
| 9,869,513 B2 * | 1/2018 | Kuu | F26B 5/06 | |
| 10,113,797 B2 * | 10/2018 | Dern | F26B 5/06 | |
| 10,143,716 B2 * | 12/2018 | McArthur | A61K 36/22 | |
| 10,206,409 B2 * | 2/2019 | Peterson | A23C 9/1307 | |
| 10,451,346 B1 * | 10/2019 | Nguyen | F26B 5/06 | |

* cited by examiner

CONCENTRATED FRUIT JUICE POWDER AND METHOD FOR PREPARING THE SAME USING A NON-LINEAR SCREW PRESS JUICER AND CONVECTION CURRENT FREEZE DRYING APPARATUS

CLAIM OF PRIORITY

This application is a continuation application-in-part (CIP) under 35 U.S.C. § 120 of application Ser. No. 16/258,639, entitled "Fully Automatic Convection Current Freeze Drying Method", filed on Jan. 27, 2019 which is a continuation application of application Ser. No. 16/371,079, entitled, "Convection Current Freeze Drying Apparatus and Method of Operating the Same", filed on Mar. 31, 2019. The patent applications identified above is incorporated here by reference in its entirety to provide continuity of disclosure.

FIELD OF THE INVENTION

The present invention relates generally to method of extraction of juice from fruits and of preserving fruit juice. More particularly, this invention relates to the extraction and freeze drying of fruit juice.

BACKGROUND ART

Fruits and plants are important diets beneficial to our health. Ambarella fruits, pennywort (Centella asianatica); pineapples; kumquats; durians; the mixture of beetroot, apple, and passion fruit; passion fruits; and soursops are all not only deliciously edible fruits and plants but also known for their medicinal benefits. Their extracted juice are not only refreshingly delicious but also have many medicinal benefits after consumption. One serving of ambarella fruit provides 48 Kcal of energy, 1 gram of protein, 12 grams of carbohydrate, 233 IU of vitamin A, 30 mg of vitamin C, 15 mg of calcium, 3 mg of iron and 22 grams of phosphorus. Ambarella fruit also contains dietary fibber and vitamin B complex constituents like thiamine and riboflavin. Other medicinal benefits of ambarella fruits include: boosting immune system, improving skin health, treating coughs, treating digestive problems, improving vision, providing energy, and helping in weight loss. More particularly, ambarella fruits are rich in vitamin C which improves the function of the immune system. They also improve the formation of collagen and accelerate the wound healing process. Antioxidants in the ambarella fruit help preventing free radical damage. In addition, the vitamin C content of the fruit helps in tissue repair and nourishes the skin. Ambarella fruit is a good source of vitamin A. It plays an important role in the visual perception. The compound of vitamin A known as retinol helps distribute images that are received by the retina of the eye. Other benefits of the ambarella fruits include: the antioxidants present in the fruit fight against cancer. It helps in the renewal of tissues and protects against cardiovascular diseases.

Pennywort—found in most tropical and subtropical countries growing in swampy areas—is clonal, perennial herbaceous creeper belonging to the family Umbellifere (Apiceae). The primary active constituents of pennywort are saponins (also called triterpenoids), which include asiaticosides, in which a trisaccharide moiety is linked to the aglycone asiatic acid, madecassoside and madasiatic acid. These triterpene saponins and their sapogenins are mainly responsible for the wound healing and vascular effects by inhibiting the production of collagen at the wound site. Apart from wound healing, the herb is recommended for the treatment of various skin conditions such as leprosy, lupus, varicose ulcers, eczema, psoriasis, diarrhoea, fever, amenorrhea, diseases of the female genitourinary tract and also for relieving anxiety and improving cognition. Pennywort also strengthens the weak veins, has antipedressant properties, antiepileptic properties: it increases the cerebral levels of GABA, cognitive and antioxidant properties, gastric ulcer, antinociceptive and antiinflmmatory properties, and radiophroection.

Coconut juice is rich in Calcium (Ca), magnesium (Mg), and potassium (K). Potassium helps keep fluid and electrolyte balance in the body, especially during exercise. Because there is more potassium than sodium in coconut water, the potassium may help balance out sodium's effect on blood pressure and possibly even help lower it. Calcium is vital for more than just strong bones and teeth. It helps muscles contract and work properly. As one exercises, his/her muscles pull on the bones and break them down slightly. As the body recovers, the bones use calcium to get stronger and repair. Magnesium helps to move calcium and potassium into muscles to aid in contraction and relaxation. It also helps with energy production and supports organ function. A hard workout can leave one person depleted in magnesium and prone to cramps, restless muscles, and spasms. In addition to all of its hydrating benefits, coconut juice contains antioxidants that help to neutralize oxidative stress and free radicals created by exercise.

Bromelain is an enzyme that is present in the pineapple juice. It helps the body break down and digest proteins. In capsule form, bromelain may reduce swelling, bruising, healing time, and pain after surgery. Pineapple juice from the core, stem, and flesh suppressed the growth of ovarian and colon cancer cells. Pineapples also provide a good quantity of beta carotene which can help reducing risk of colon cancer. Pineapple juice contains vitamin C and beta carotene. These antioxidants can help reduce wrinkles, improve overall skin texture, and minimize skin damage from sun and pollution exposure. Vitamin C also helps with the formation of collagen, which is a common protein in the body that gives the skin its strength and structure. The vitamin C content of pineapples may help preserve eye health. Vitamin C can reduce the risk of cataract progression by one-third.

Kumquats contain several unique antioxidant flavonoids (such as DGPP, margaritene, isomargaritene, fortunellin, and poncirin). Kumquat juice can break down free radicals and their antioxidant activity which increases with the flavonoid content. Vitamin C is another powerful antioxidant found in relatively high amounts in kumquats (approximately 12 mg/fruit). Kumquat juice probably can turn on PPAR-a, a protein that revs up metabolism and fat-burning. Free radical-damaged LDL triggers an inflammatory response that causes cholesterol to build up inside the arteries. Kumquats also contain phytosterols (amyrin, lupenone, and sitosterol) which interfere with its uptake in the gut. In addition, Kumquats are a source of calcium, a mineral that is essential to bone formation and health. Indeed, the flavonoid poncirin promotes the formation of the cells that build and repair bones (osteoblasts), while preventing mineral loss caused by osteoporosis. Beta-cryptoxanthin is the carotenoid found in kumquats. The body can use it to build antioxidant defense and make vitamin A. Juice enriched with beta-cryptoxanthin increased bone formation and reduced its breakdown by blocking bone-degrading cells (osteoclasts). Complex sugars isolated from kumquat blocked the pancreatic enzyme that helps digest fats in the gut.

Drinking durian juice helps prevent constipation and improves digestive health. The thiamin in the fruit may improve appetite and general well-being in the elderly. The fiber in durian fruit also stimulates peristaltic motion. It may ease the digestive process in the intestines. It also helps treat issues like bloating, excess flatulence, heartburn, and cramps. The organosulfur in durians may regulate the inflammatory enzymes and reduce the risk of cardiovascular diseases. Intake of fruit juice that are rich in soluble dietary fiber may help lower the levels of low-density lipoprotein cholesterol (LDL-C) and reduce the risk of coronary heart disease. Durian juice is a heart-friendly food with a high fiber content. The manganese (Mg) in durian may help in the maintenance of blood sugar levels. The antioxidants in durian also help reduce oxidative stress, which can otherwise aggravate diabetes symptoms. Durian also has a lower glycemic index (GI). Hence, the fruit would not lead to blood sugar spikes. Durian is a good source of potassium (K) which helps lowering blood pressure, acting as a vasodilator. Durian is rich in vitamin C. The nutrient is a powerful antioxidant that reduces oxidative stress caused by free radicals. The lower the oxidative stress levels, the slower the aging process. Durian is rich in other antioxidants that may help reduce cancer risk. The fruit contains polyphenols that inhibit cancer growth and even kill cancer cells. Since the antioxidants of durians fight free radicals, they may also help in lowering cancer risk. Durians are rich in potassium (K) and magnesium (Mg). These two minerals contribute to bone health. Durian is a rich source of folate which can promote the number of red blood cells produced. Other minerals in durian may trigger the production of red blood cells (RBC). Durian may help in the production of serotonin which helps relieving the symptoms of depression, anxiety, and stress.

Passion fruit is a flowering tropical vine, known as *Passiflora*, which grows in warm climates. It contains a soft yellow pulp and lots of seeds inside a hard rind. The health benefits for consuming passion fruits include: key nutrients such as vitamin A, potassium (K), magnesium (Mg), vitamin C, calcium (Ca), iron (Fe), and fiber; rich in antioxidants; good source of fiber; low glycemic index (GI); source of insulin such as piceatannol; boosting the immune system; and supporting heart health.

Beetroots can help lower a person's blood pressure because it contains anti-inflammatory compounds called betalains which inhibit specific signaling pathways that play a role in inflammatory diseases. A betalain called phenethylamine-betaxanthin reduced the activity of an inflammatory enzyme by 32 percent. Beetroots are rich in iron (Fe), an essential component of red blood cells. Without iron, red blood cells cannot transport oxygen around the body. People who have low iron levels can sometimes develop a condition called iron deficiency anemia. Adding sources of iron to the diet can reduce the risk of this condition. Beetroot juice contains antioxidants, vitamin A, vitamin B-6, and iron. These compounds help protect the liver from inflammation and oxidative stress while enhancing its ability to remove toxins from the body. Certain compounds in beetroot juice, such as nitrates and betalains, may improve athletic performance. Nitrates in beetroot can boost a person's athletic efficiency by increasing blood flow and oxygen to the muscles.

Due to its high fiber content, soursop fruit juice may aid with proper digestion. The fruit's juice can also act as a diuretic and cleanse the gastrointestinal tract by removing excess sodium from the body. An extract of soursop has been shown to help heal gastric ulcers in lab animals. Like most fruits and vegetables, soursop is a good source of antioxidants, which might help the body repair cell damage and combat inflammation.

With such abundance of health benefits listed above, these fruit juices and mixtures are in high demands owing to the facts that the liquid form (a) is the easiest way to consume and it tastes delicious, (b) is easy to preserve and high in availability. Furthermore, consumer demands for unpasteurized fruit juices have increased because they have lower content of sodium, cholesterol and fat, and higher concentration of vitamin C, polyphenols, minerals, and antioxidants than fruits with preservatives. However, fruit juices are spoiled primarily to to proliferation of acid tolerant and osmophilic microflora. There is also risk of food borned microbial infections which is associated with the consumption of fruit juirces. If left outside of the refrigerator for 15 minutes, these fruit juices would have adverse effects on the stomach and intestines. If prepared in unhygienic conditions, these fruit juices may lead to diarrhea and other illnesses. Yeasts, decomposition bacteria, and pathogenic bacteria such as salmonella can contaminate amberella fruit juice during the peeling and extraction processes. In order to reduce the incidence of outbreaks, fruit juices are preserved by various techniques.

The traditional preservation of the fruit juice by boiling at high temperatures will cause it to lose a lot of nutrients, color, and it delicate fragrance. If fact, boiling the fruit juice creates sugar, which is different from the original fruit juice. Adding acidulant and preservatives to preserve the fruit juice from microorganism affects the juice color and taste, causing final consumers to turn it down.

Most artisan farmers peel the skin the fruits, remove their seeds, cut the fresh into pieces, crush them in a juicing screw press, and then sieve them to remove the pulps. Conventional juicing screw press is consisted of at least one screw presses that move the fruits from a low pressure region to a high pressure region, separating the juice and the pulps. For preservation, the extracted fruit juices are boiled in open pans at high temperatures between 89° C. to 92° C. until soluble solid contents near to 70 Brix. The concentration of soluble solids in the juice increases the temperature, exceeding 100° C. Just before of the syrup solidification, the temperature is ranging between 118° C. to 125° C., and the soluble solid content of syrup is higher than 88 Brix.

Thermal pasteurization is used commercially in fruit juice industries for the preservation of fruit juices but results in losses of essential nutrients and changes in physicochemical and organoleptic properties. Nonthermal pasteurization methods such as high dydrostatic pressure, pulsed electric field, and ultrasound and irrationtions have also been employed in fruit juices to overcome the negative effects of thermal pasteurization. However, some of these techniques are only in the research or pilot scale. Some of them have been commercialized but very expensive.

Another common method to preserve the liquid form fruit juice is a conventional vacuum freeze drying apparatus. In the traditional vacuum freeze drying method (lyophilization), temperature and vacuum are controlled to achieve sublimation and desorption of water vapors from the product. In addition to avoid changes in the dried product appearance and characteristics, drying by sublimation can yield a product that has a short reconstitution time with acceptable potency levels. However, the traditional vacuum freeze drying method usually reduce chemical stability of high-water content products such as fruits.

However, these well-known methods of extracting, sanitizing, and preserving fruit juices are inefficient that need improvements. First, the prior-art screw press juicing machines do not have high extraction efficiency due the design of the screw press. The extraction efficiency of the prior-art screw press juicing machines ranges between 34%-80%. In the U.S. Pat. No. 4,323,007 by Hunt (hereinafter referred to as the '007 patent), a screw 20 consists of a base 22 mounted to and concentric with drive shaft 26. The drive shaft 26 has a small diameter at its front end and a large diameter at its rear end with its surface forming a frusto-conical shape having a continuous slope. Spiral screw threads 24 are affixed to the surface of the body portion 22 and have a constant diameter with sufficient clearance to turn with the walls of the cage 40. The efficiency of the screw press of the '007 patent is 80%. Furthermore, the method and apparatus of the '007 patent create opportunities for microorganisms to contaminate the extracted juice.

Therefore, what is needed is a method and a system that can convert extracted fruit juice to concentrated powder which is chemically stable, has a long shelve life, short reconstitution time with excellent potency levels—the original fragrance, nutrients, vitamins, color are preserved.

What is needed is a system that includes an industrial screw press apparatus that has a high extraction efficiency and high output capacity.

What is needed is a system that are fully automatic, i.e., controlled and observed by a controller unit or a computer that can create optimal freeze drying conditions for fruits.

What is needed is system that can provide a high rate of cooling so that the microscopic structures of fruits are preserved.

Yet, what is needed is a system that can provide specific settings including eutectic temperatures ($T_{eu}$), optimal temperatures ($T_{opt}$), pressures, and cooling rates for fruits so that structural collapse can be avoided.

Finally, what is needed is a fruit juice composition powder that includes probiotics so that it is easy to digest after reconstitution by mixing with water.

The method and system disclosed in the present invention solve the above described problems.

SUMMARY OF THE INVENTION

Accordingly, an object of the present invention is to provide a concentrated fruit juice powder obtained by a process that includes: selecting and preparing fruits by predetermined quality guideline; extracting fruit juice by inserting the fruits into a screw press juicing apparatus having a precutter and a screw press whose body surface varies non-linearly along the length of the screw press; adding probiotics into the extracted fruit juice; freezing the fruit juice mixed with the probiotics in molds using an individual quick freezer (IQF) to obtain frozen fruit juice blocks; and vacuum freezing the frozen fruit juice blocks using a convection current vacuum freeze drying apparatus.

Another object of the present invention is to provide a method for preparing a concentrated fruit juice powder that includes: selecting and preparing fruits by a predetermined quality guideline; extracting fruit juice by inserting the fruits into a screw press juicing apparatus having a precutter and a screw press whose body surface varies non-linearly along the length of the screw press; adding probiotics into the extracted fruit juice; freezing the fruit juice mixed with the probiotics in molds using an individual quick freezer (IQF) to obtain frozen fruit juice blocks; and vacuum freezing said frozen fruit juice blocks using a convection current vacuum freeze drying apparatus.

Another object of the present invention is to provide a system for manufacturing concentrated fruit juice powder that includes: a screw press juicing apparatus having a precutter and a screw press juicing apparatus having a precutter and a screw press whose body surface varies non-linearly along the length of the screw press, an individual quick freezer (IQF), and a convection current vacuum freeze drying apparatus with a condenser that have a high rate of cooling using heat transfer of natural convection currents between the condenser unit and a plurality of elongate tubes having circumferential fins.

Another object of the present invention is to achieve a vacuum freeze drying apparatus and process that are fully automatic, i.e., controlled and observed by a controller unit or computer that can create an optimal freeze drying condition for each type of fruit juice.

Another object of the present invention is to achieve a vacuum freeze drying apparatus and method that can provide a high rate of cooling using heat transfer of natural convection currents between the condenser unit and a plurality of elongate tubes having circumferential fins.

Furthermore, another object of the present invention is to achieve a vacuum freeze drying apparatus and process that can provide a deep and uniform freezing zone of the same temperature and pressure so that the quality of the fruit juice being freeze dried is uniform.

Yet, another object of the present invention is to achieve a vacuum freeze drying apparatus and process that can provide specific settings including temperatures, pressures, and cooling rates for fruit juice so that structural collapse can be avoided.

Another object of the present invention is to provide a concentrated fruit juice powder mixed with a predetermined amount of probiotics that improves digestive health, and powerful benefits for body and brain.

Finally, another object of the present invention is to achieve a computer software program stored in a non-transitory memory that can perform an optimal convection current vacuum freeze drying process for fruit juice when such computer software program is executed by a controller unit.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
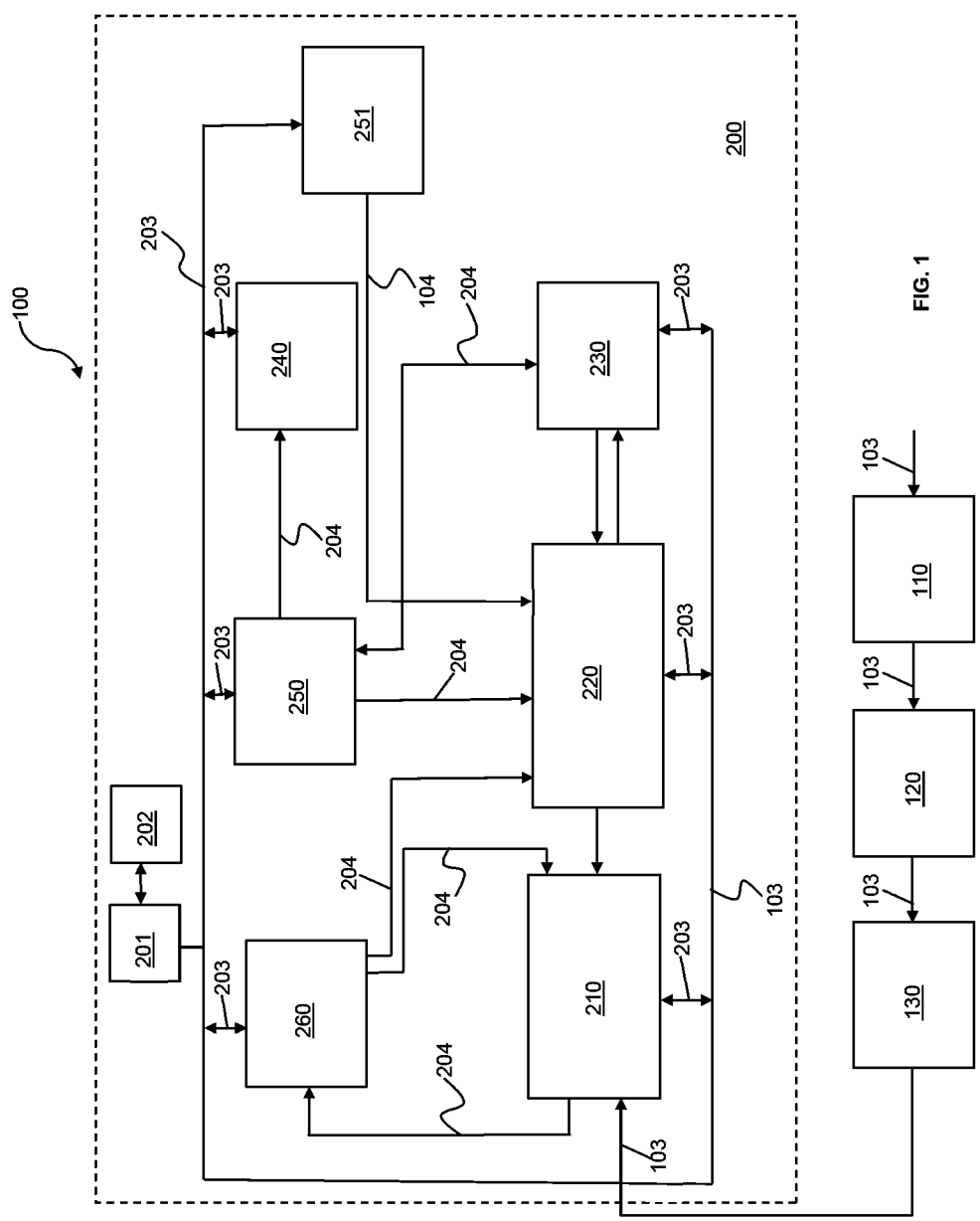
FIG. 1 is a block diagram illustrating a system for preparing concentrated fruit juice powder using a convection current vacuum freeze drying apparatus and a screw press juicing apparatus having a precutter and a novel non-linear screw press in accordance with an embodiment of the present invention.

One embodiment of the invention is now described with reference to FIG. 1. FIG. 1 illustrates a block diagram of a system 100 for preparing concentrated fruit juice powder using a convection current vacuum freeze drying apparatus and a screw press juicing apparatus having a non-linear screw press in accordance with an exemplary embodiment of the present invention. System 100 includes a fruit selection and preparation station 110, a screw press juicing apparatus 120, a pre-freezing individual quick freezer (IQF) 130, and a convection current vacuum freeze drying apparatus 200. In various embodiments of the present invention, preparation station 110 includes visual inspection performed by human operators in combination with Brix measurements refractometer. In some other exemplary embodiments, preparation station 110 includes a customized and integrated fruit and vegetables selecting and packing system of more than 35 different types of fruits with built-in Brix measurement unit with fruit parameters and guidelines. The customized and integrated fruit and vegetables selecting and packing system is equipped with high-resolution cameras and classifies each fruit with the highest efficiency and accuracy, ensuring an unprecedented selection accuracy. Avoiding invasive processes, this technology can take into account and connect an extraordinary complexity of parameters, including: size, color, shape, and integrity, degree of ripeness, internal and external defects, sourness and degree Brix. The predetermined selection guidelines and parameters for exemplary fruits are disclosed in Table 1 below.

TABLE 1

| Predetermined Preparation Guidelines for Examplary Fruits | | |
|---|---|---|
| Products | Preselection Guidelines | Additives |
| Ambarella Fruits (*Spondias Durcis*) | Ripe, green external color, sort and select only those without dark spots or overripen. Wash, separate the flesh and the pit; keep the flesh and throw away the pit. introduce the flesh to the non-linear screw press juicing apparatus to obtain the ambarella juice. | Probiotics (*Lactobacillus, Streptococus, Bifidobacterium*), Malto syrups 10%-20%, sugar depending on sweetness versus sourness |
| Passion Fruits (*Passiflora edulis*) | Fresh and yellow flesh, firm, dark brown rinds; free of surface depression or cracking; free of pets or damage; rinse, cut into halves, scoop out the yellow flesh, discard the rinds. introduce the yellow flesh to the non-linear screw press juicing apparatus to obtain the passion fruit juice. | Probiotics (*Lactobacillus, Streptococus, Bifidobacterium*), Malto syrups 10%-20%, sugar depending on sweetness versus sourness |

TABLE 1-continued

Predetermined Preparation Guidelines for Examplary Fruits

| Products | Preselection Guidelines | Additives |
| --- | --- | --- |
| Beetroots (*Beta vulgaris*) | Fresh, heavy and 4-5 bulbs per kilogram, free of pests and damage as well as rots. Wash, cut off the tops and bottoms, and the stalks. Introduce the beetroots into the non-linear screw press juicing apparatus to obtain the pennywort fruit juice. | Probiotics (*Lactobacillus, Streptococus, Bifidobacterium*), Malto syrups 10%-20%, sugar depending on sweetness versus sourness |
| Pennywort (*Centella asianatica*) | Fresh, dark green in color, free of yellow rot or damage. Introduce pennywort plants or stems to the non-linear screw press juicing apparatus to obtain the pennywort fruit juice. | Probiotics (*Lactobacillus, Streptococus, Bifidobacterium*), Malto syrups 10%-20%, sugar depending on sweetness versus sourness |
| Coconut Milk (*Cocos nucifera*) | Select only overripen coconuts without juice; cut into halves, grate off the flesh; introduce the flesh into the non-linear screw press juicing apparatus to obtain the coconut milk. | Probiotics (*Lactobacillus, Streptococus, Bifidobacterium*), Malto syrups 10%-20%, sugar depending on sweetness versus sourness |
| Apples (*Malus dometica*) | Fresh, free of surface depression, rots; select only juicy ones. Cut away the endocarp or core, discard the pips. introduce the mesocarp of pulps and edible parts to the non-linear screw press juicing apparatus to obtain the apple juice. | Probiotics (*Lactobacillus, Streptococus, Bifidobacterium*), Malto syrups 10%-20%, sugar depending on sweetness versus sourness |
| Pineapple (*Ananas comosus*) | Fresh, juicy, ripen, without depression and rots. Peel the skins, cut away the eyes and the core introduce to the non-linear screw press juicing apparatus to obtain the pineapple juice. | Probiotics (*Lactobacillus, Streptococus, Bifidobacterium*), Malto syrups 10%-20%, sugar depending on sweetness versus sourness |
| Durian (*Durio zibethinus*) | Fresh, ripe without being prematurely consumed selected from either Thai ™ or Sau Ri branches ™; Store until ripe with nice aroma; open up the fruits to collect the arils and discard the seeds; introduce the flesh to the non-linear screw press juicing apparatus to obtain the durian juice | Probiotics (*Lactobacillus, Streptococus, Bifidobacterium*), Malto syrups 10%-20%, sugar depending on sweetness versus sourness |
| Kumquats (*Fortunella japonica*) | Fresh, ripen, thin peels, free of damage or rots. Rinse, cut into halves. introduce kumquats to the non-linear screw press juicing apparatus to obtain the kumquat juice | Probiotics (*Lactobacillus, Streptococus, Bifidobacterium*), Malto syrups 10%-20%, sugar depending on sweetness versus sourness |
| Soursop fruits (*Annona muricata*) | Fresh, not ripen. Store until ripen and soft, rinse, peel off the skins, cut open to obtain the flesh, and discard the seeds and the cores. introduce the flesh to the non-linear screw press juicing apparatus to obtain the soursop juice. | Probiotics (*Lactobacillus, Streptococus, Bifidobacterium*), Malto syrups 10%-20%, sugar depending on sweetness versus sourness |

Continuing with FIG. 1, in many exemplary embodiments of the present invention, convection current vacuum freeze drying apparatus 200 further includes a dryer chamber unit 210, an ice condenser unit 220, a refrigerator unit 230, a cooling tower unit 240, a vacuum pump unit 250, and a heater unit 260, all connected together by mechanical connectors 103. In various embodiments of the present invention, mechanical connectors 103 are hollow tubes of different shapes and sizes that facilitate the flowing of fluids between the units. In some embodiments of the present invention, system 100 also includes a controller unit 201 and a database 202. Database 202 is configured to contain specific vacuum freeze drying settings for fruits which have specific vacuum freeze drying settings including triple point temperatures, eutectic temperatures ($T_{eu}$), drying times, freezing rate, pressure, etc. which are studied beforehand and stored in database 202. When fruits are selected to be vacuum freeze dried, specific vacuum freeze drying settings stored in database 202 will be loaded into controller unit 201. Afterwards, controller unit 201 uses the specific vacuum freeze drying settings to operate system 100 in accordance to a specific process designed for a specific fruit among the selected fruits. It is noted that different types of fruits not mentioned within the present disclosure and their specific vacuum freeze dried settings are also within the scope of the present invention. Yet, in many embodiments of the present invention, mechanical connectors 103 also connect sensing devices such as temperature sensors, pressure sensors, flow meters, timing devices, switches, and valves that can communicate with and be controlled by controller unit 201. The detailed description of these sensing devices and an exemplary embodiment of system 100 will be disclosed in FIG. 2.

Continuing with FIG. 1, main features of the present invention lie in screw press juicing apparatus 120, convection current ice condenser unit 220, controller unit 201, database 202, and the specific operating process for fruits. In various embodiments of the present invention, screw press juicing apparatus 120 includes a precutter and a novel screw press having a non-linear body surface designed to provide maximum extraction efficiency of 98%.

In many embodiments of the present invention, convection current ice condenser unit 220 includes a plurality of first elongate heat exchange tubes with fins arranged around the outer circumference of the first elongate heat exchange tubes so that natural convection currents optimize the heat exchange between cold airs from refrigerator unit 230, ice condenser unit 220, and dryer unit 210. As a result, the following objects of the present invention are achieved:

The maximum extraction efficiency is achieved, saving energy, improving overall efficiency, and avoiding unwanted large chunks of pulps from falling into the juice.

A uniformly distributed and constant cold air is created throughout the entire ice condenser unit 220 and dryer unit 210;

The freezing rate can be exactly controlled;

Fruits are vacuum freeze dried homogeneously without undesired quality variations due to location difference as in conventional vacuum freeze drying systems; and Specific vacuum freeze drying settings for fruits can be learned beforehand and stored in database 202, controller unit 201 can execute the vacuum freeze drying process for each type of fruits in a precise manner and settings. As such, additional objects of the present invention are achieved:

The essence of fruit juice is captured at the moment fruits are at their best quality. Fruit juice quality and essence are changed with time as they are exposed to air. If the vacuum freeze drying is either too slow or too fast, the essence of the vacuum freeze dried fruit juice is lost. Equipped with the exact vacuum freeze drying rate, time, and settings and stored them in database 202, controller unit 201 can execute the process to capture fruit juice at their best qualities.

Figure 2:
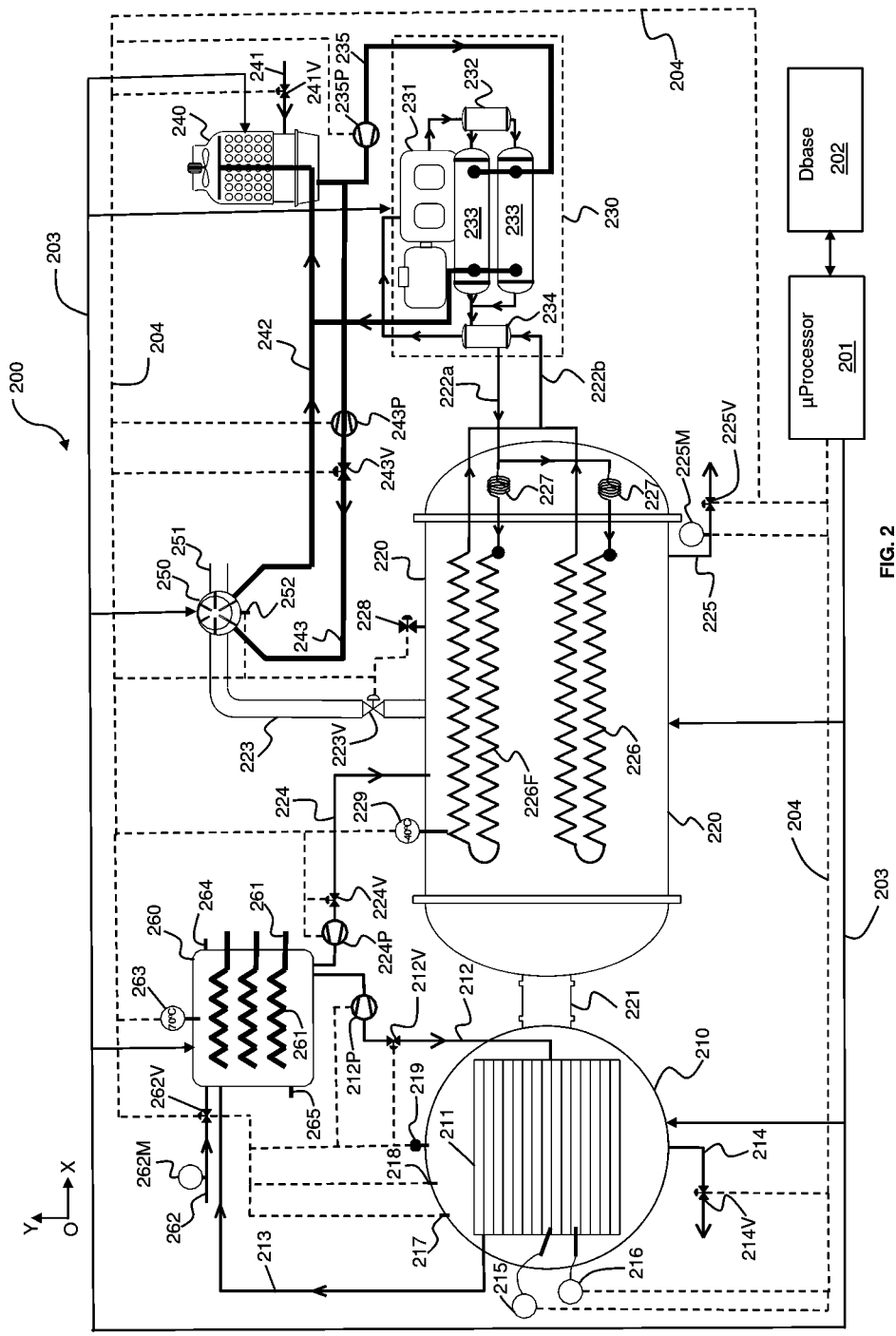
FIG. 2 is a schematic diagram of a convection current vacuum freeze drying apparatus used to dry blocks of frozen fruit juice mixed with probiotics in accordance with an exemplary embodiment of the present invention.

Now referring to FIG. 2, a schematic diagram of a (natural) convection current vacuum freeze drying apparatus ("CCVFD apparatus") 200 in accordance with an exemplary embodiment of the present invention is illustrated. Convection current vacuum freeze drying apparatus 200 ("CCVFD apparatus 200") includes dryer unit 210, a convection current condensing unit (ice condenser unit) 220, a refrigerator unit 230, a cooling tower unit 240, a vacuum pump unit 250, and a heater unit 260. In various embodiments of the present invention, apparatus 200 is not a stand-alone device. It is a network-based device that is connected to a controller unit 201 and a database 202 in a network (not shown). The network can be a wide area network (WAN), a local area network (LAN), a wireless sensor network (WSN), or a cloud-based network. Furthermore, ice condenser unit 220 includes a plurality of first elongate tubes with fins that accelerate the heat exchange by natural convection currents between the cold temperatures inside ice condenser unit 220 and refrigerator unit 230, providing fast cooling rate and uniformly distributed cold air.

Continuing with FIG. 2, controller unit 201 and database 202 are connected to CCVFD apparatus 200 by communication channels 203. Sensors described below are connected to controller unit 201 by communication channels 204. Communication channels 204 are wireless communication channels such as Wi-fi, Bluetooth, RF, optical, Zigbee, etc. In some embodiments, communication channels 204 maybe data transmission cables such as RS-232, RS-422, or RS-485, etc.

Controller unit 201 serves as the brain of convection current vacuum freeze drying apparatus 200. In some exemplary embodiments, controller unit 201 is a −16 or −32 bit Programmable Logic Controller (PLC), a Supervisory Control and Data Acquisition (SCADA), or any other type of programmable logic array (PLA) consisting of a memory chip and integrated circuits for control logic, monitoring, and communicating. Controller unit 201 directs the programmable logic controller (PLC) and/or to execute control instructions, communicate with other units, carry out logic and arithmetic operations, and perform internal diagnostics. Controller unit 201 runs memory routines, constantly checking the PLC to avoid programming errors and ensure the memory is undamaged. Memory provides permanent storage to the operating system for database 202 used by controller unit 201. Five programming languages are used in controller unit 201 and PLC. They are defined by the international standard IEC 61131. Ladder logic is one of the most commonly used PLC languages. Another programming language is function block diagram (FBD). It describes functions between input and output variables. The function, represented by blocks, connects input and output variables. FBD is useful in depicting algorithms and logic from interconnected controls systems. Structured Text (ST) is a high-level language that uses sentence commands. In ST, programmers can use "if/then/else," "SART," or "repeat/until" statements to create programs. Instruction list (IL) is a low-level language with functions and variables defined by a simple list. Program control is done by jump instructions and sub-routines with optional parameters. Sequential Function Chart (SFC) language is a method of programming complex control systems. It uses basic building blocks that run their own sub-routines. Program files are written in other programming languages. SFC divides large and complicated programming tasks into smaller and more manageable tasks.

Dryer unit 210 includes trays 211, a hot water pipe 212, a freeze dried chamber-heater hot water valve 212V ("hot water valve 212V"), a freeze dried chamber-heater hot water pump 212P ("hot water pump 212P"), a return water pipe 213, a discharge water pipe 214, a discharge water valve 214V, a first tray temperature transmitter 215, a second tray temperature transmitter 216, a front door switch 217, a rear door switch 218, a vacuum pressure transmitter 219, all connected as shown in FIG. 2. Hot water valve 212V, hot water pump 212P, discharge water valve 214V, first tray temperature transmitter 215, second tray temperature transmitter 216, front door switch 217, rear door switch 218, vacuum pressure transmitter 219 are network devices that can communicate with controller unit 201.

Continuing with FIG. 2, convection current condensing unit (ice condenser unit) 220 connects to dryer unit 210 by a large ice condenser and freeze dried chamber connection pipe 221. Ice condenser unit 220 is connected to refrigerator unit 230 via a liquid refrigerant pipe 222a, a gaseous refrigerant pipe 222b, expansion capillary tubes 227; to vacuum pump unit 250 via a vacuum pipe 223, a vacuum isolating valve 223V; to heater unit 260 via an ice condenser heater hot water pipe 224, an ice condenser heater hot water valve 224V, an ice condenser heater hot water pump 224P, an ice condenser discharge valve 225, an ice condenser discharge flow meter 225M, and an ice condenser discharge valve 225V. Ice condenser unit 220 further includes convection current heat exchanging tubes with fins 226F, convection current heat exchanging tubes without fins 226, a vacuum release valve 228, and an ice condenser temperature transmitter 229. In many embodiments, vacuum isolating valve 223V, ice condenser heater hot water valve 224V, ice condenser heater hot water pump 224P, ice condenser discharge valve 225, ice condenser discharge flow meter 225M, and ice condenser discharge valve 225V, vacuum release valve 228, and ice condenser temperature transmitter 229 are network devices controlled by controller unit 201.

Still referring to FIG. 2, refrigerator unit 230 includes a compressor 231, a refrigerant container 232, a liquid refrigerant heat exchanger 233, a refrigerant heat exchanger 234, a cooling water pipe 235, a cooling water pump 235P. Cooling water pump 235B is network device that can be controlled by controller unit 201.

Still referring to FIG. 2, cooling tower unit 240 includes a feed water pipe 241, a feed water valve 241V, a hot water returning pipe 242, a cooling water pipe for vacuum pump unit 243, a cooling water pump for vacuum pump unit 243P, a cooling water valve for vacuum pump unit 243V. Feed water valve 241V, cooling water pipe for vacuum pump unit 243, cooling water pump 243P, a cooling water valve 243V are network devices which can be controlled and communicated to controller unit 201. Vacuum pump unit 250 includes a vacuum input pipe 251 and a current transformer transmitter which is network device. Water heater unit (heater) 260, a three-phase heating element 261, a feed water pipe 262, a feed water flow meter 262M, a feed water valve 262V, a heater temperature transmitter 263, a high water level sensor 264, and a low water level sensor 265 which are also network devices. In some embodiment of the present invention, a Hanbell vacuum type PS1302-AC1 with pumping speed of 15700 L/m, power source of 389V at 50 Hz, and ultimate pressure of 0.00075 torr is used.

In operation, apparatus 200 is fully controlled by controller unit 201 as described in details in process 800 below. In other words, in various embodiments of the present invention, process 800 including operational steps 801 to 820 are implemented by apparatuses 100 and 200. The detailed description of apparatus 200 is described in application Ser. No. 16/258,639, entitled "Fully Automatic Convection Current Freeze Drying Method", filed on Jan. 27, 2019 which is a continuation application of application Ser. No. 16/371,097, entitled, "Convection Current Freeze Drying Apparatus and Method of Operating the Same", filed on Mar. 31, 2019. These patent applications identified above is incorporated here by reference in its entirety to provide continuity of disclosure.

Figure 3:
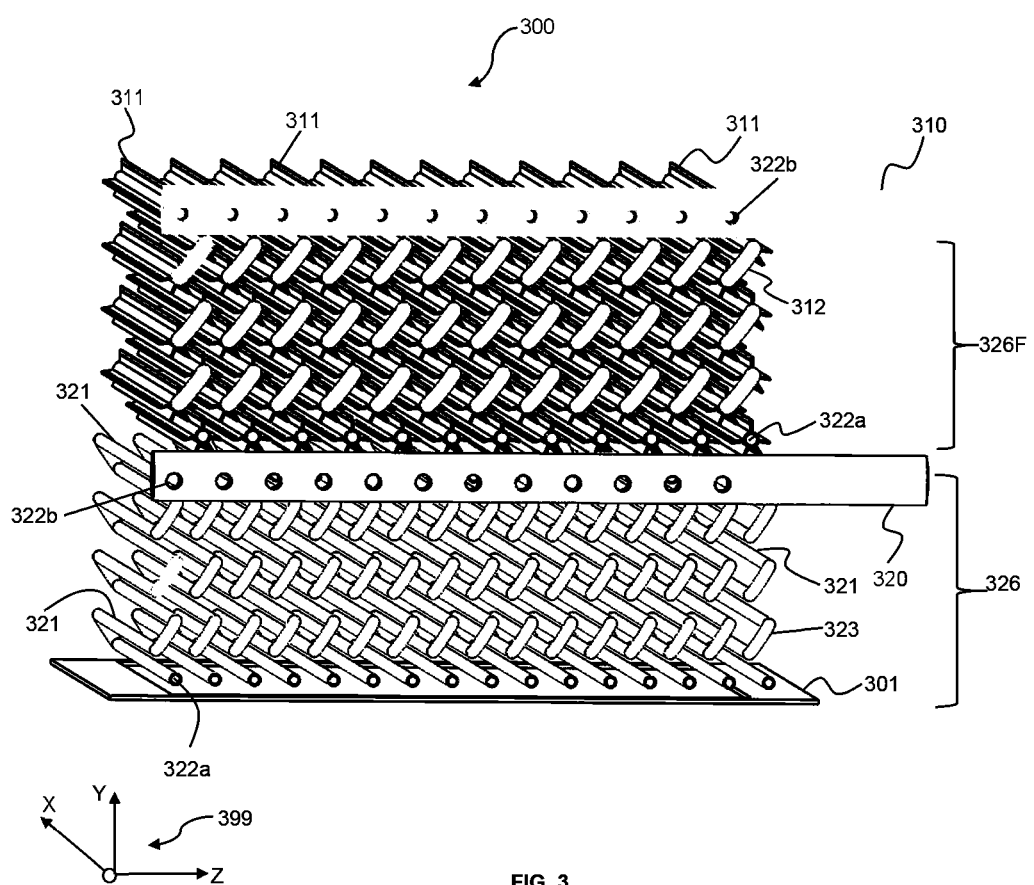
FIG. 3 is a three-dimensional perspective diagram of the internal structure of the ice condenser unit of the convection current vacuum freeze drying apparatus used to dry blocks of frozen fruit juice mixed with probiotics in accordance with an exemplary embodiment of the present invention.

Now referring to FIG. 3, a three-dimensional diagram of the internal structure 300 of the convection current ice condenser unit 220 in accordance with an exemplary embodiment of the present invention is illustrated. Internal structure 300 includes a rectangular base 301 spanning along a horizontal z-direction of an xyz coordinate 399. An array of first elongate heat exchange tubes with fins 326F and an array of second elongate heat exchange tubes without fins 326 are stacked on top of each other and rectangular base 301. Specifically, array of first elongate heat exchange tubes with fins 326F is a three-dimensional M×N array, where M is the number of first elongate heat exchange tubes with fins 311 along the z-direction and N is the number of first elongate heat exchange tubes with fins 311 along the vertical Y direction. Each first elongate heat exchange tubes with fins 311 has a length L spanning along the X direction. In one exemplary embodiment, M is 12, N is 8, and L is 30 mm. In other words, the number of first elongate heat exchange tubes with fins 311 in a row along the Z direction is 12. The number first elongate heat exchange tubes with fins 311 in a column along the Y direction is 8. The length of first elongate heat exchange tubes with fins 311 is 30 mm. Together, the number of first elongate heat exchange tubes with fins 311 in rows Z and in columns Y and their length L form three-dimensional array 326F.

Continuing with FIG. 3, array of second elongate heat exchange tubes without fins 326 is a three-dimensional M×N array, where M is the number of second elongate heat exchange tubes without fins 321 along the z-direction and N is the number of second elongate heat exchange tubes without fins 321 along the vertical Y direction. Each second elongate heat exchange tubes without fins 321 has a length L spanning along the X direction. In one exemplary embodiment, M is 16, N is 8, and L is 30 mm. In other words, the number of second elongate heat exchange tubes without fins 321 in a row along the Z direction is 16. The number of second elongate heat exchange tubes without fins 321 in a column along the Y direction is 8. The length of second elongate heat exchange tubes without fins 321 is 30 mm. Together, the number of second elongate heat exchange tubes without fins 321 in rows Z and in columns Y and their length L form three-dimensional array 326.

Figure 4:
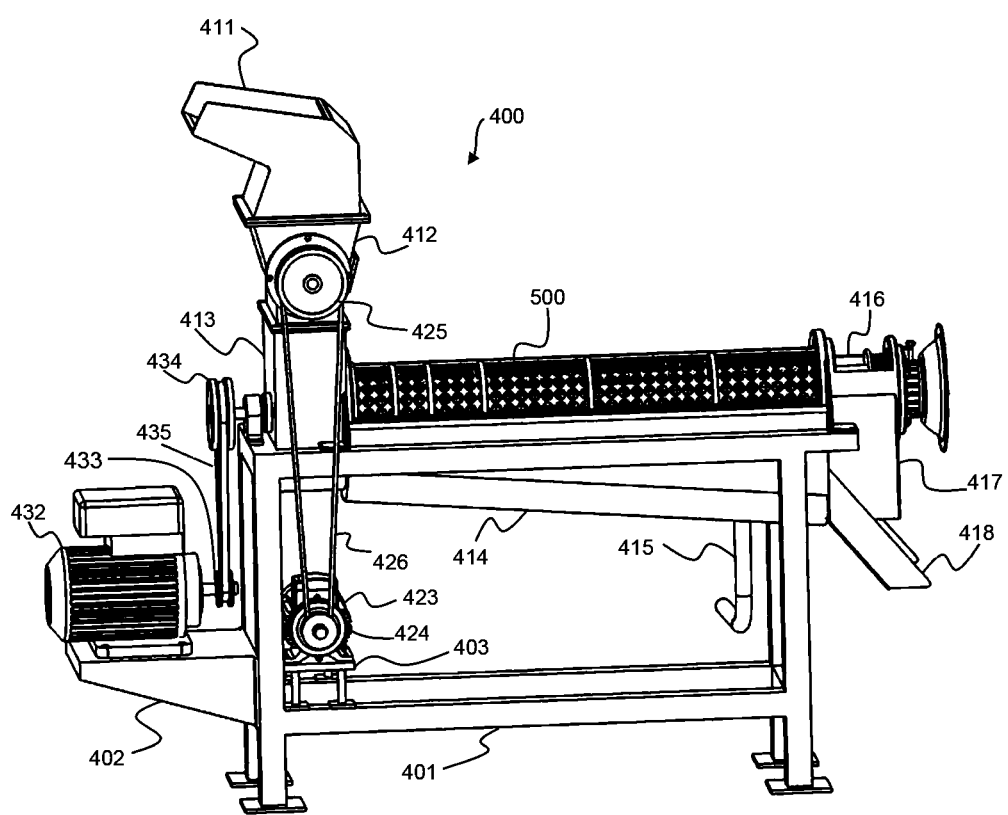
FIG. 4 is a three-dimensional (3D) perspective diagram of a screw press juicing apparatus in accordance with an exemplary embodiment of the present invention.

Now referring to FIG. 4, a three-dimensional (3D) perspective diagram of a screw press juicing apparatus 400 in accordance with an exemplary embodiment of the present invention is illustrated. Screw press juicing apparatus 400 includes a support base 401 that contains a screw press motor base 402 and a precutter motor base 403. Mounted on the top surface of support base 401 is a screw press section 500, a hopper 411, a precutter 412, inlet section 413, and an outlet section 416. Mounted on top of screw press motor base 402 is a screw press motor 432. Similarly, mounted on top of precutter motor base 403 is a precutter motor 423. In some exemplary embodiments of the present invention, precutter motor 423 is connected to precutter section 412 by a first pulley system that includes a driving wheel 424, a belt 426, and a driven wheel 425. Screw press motor 432 is connected to screw press section 500 by a second pulley system that includes a driving wheel 433, a belt 435, and a driven wheel 434. It is noted other other driving schemes such as chain gears, pneumatic amplitude motor (PAM), or combinations thereof are also within the scope of the present invention. Hopper 411 is mounted directly on top of precutter section 412 which is, in turn, stacked vertically on inlet section 413. Driven wheel 412 is connected to drive precutter section 412. Driven wheel 434 is connected to drive screw press section 500. A juice collection pan 414 is in fluid communication to receive juice from screw press section 500. A fruit juice siphon (or jute) 415 is connected to guide the fruit juice from juice collection pan 414 to the next stage. Outlet section 416 is connected to screw press section 500 at the rear end to collect unused pulps. A pulp collection chamber 417 and a drain 418 are connected to outlet section 416. Pulp collection chamber is used to dispose the unused pulps. Drainer 418 is used to drain out extra fruit juice from outlet section 416. In many embodiments of the present invention, the capacity of fruit juice extracting apparatus 400 is at 500 kg/hour.

Figure 5:
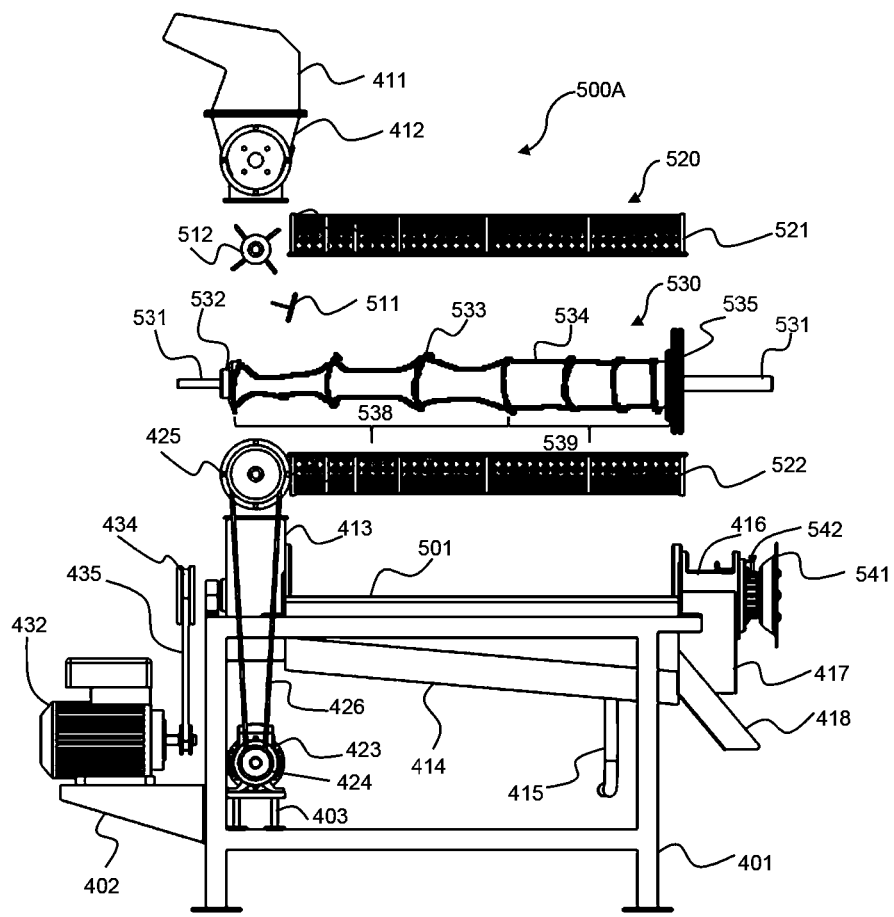
FIG. 5 is a three-dimensional (3D) perspective diagram illustrating different components of the screw press juicing apparatus having a precutter and a novel screw press in accordance with an exemplary embodiment of the present invention.

Next referring to FIG. 5, an assembly 500A of screw press juicing apparatus 400 in accordance with an exemplary embodiment of the present invention is illustrated. In most preferred embodiment, from top to bottom: hopper 411 is attached directly to precutter section 412 which further includes a fixed cutting component 511 and a rotating cutting component 512 that are interleaved to each other so as to cut the fruits into smaller pieces at a predetermined size depending on the distance between two adjacent cutting components. Screw press section 500 includes an opening 501 for placing a screw press 530 therein. Screw press 530 includes an axle 531, a front end 532, a rear end 535, a plurality of screw threads 533 and body surface 534. Rear end 535 acts as a back pressure plate as plurality of screw threads 533 change their pitch and as body surface 534 changes its geometrical shape from concave to a flat surface. Along the length of screw press 530, from front end 531 to rear end 535, the degree of concavity of body surface 534 decreases and the pitch of threads 533 increases. That is, toward rear end 535, the number of threads increases per unit length and the degree of concavity decreases. This inverse relationship creates a collection stage 538 and a juicing stage 539. Thus, in juicing stage 539, where the pressure increases to dewater the fruits, screw press 530 has the cylindrical shape and a high density (pitch) of screw threads 533.

Continuing with FIG. 5, in various embodiments of the present invention, a filter screen 520, having a cylindrical shape, includes an upper filterupper filter screen 521 and a lower filter screen 522 which are designed to enclose screw press 530 inside. The height of plurality of threads 533 are designed to asymptotically close without touching to upper filter screen 521 and lower filter screen 522. The gap between screw threads and filter screen 520 is between 0.5 mm to 1 mm. As such, fruits collected in collection stage 538 are moved to be dewatered at dewaterng stage 539 as axle 531 is turned by screw press motor 432. Next to rear end 535 is outlet section 416 which further includes pulp collection chamber 417 in connection to drainer 418. Pulps in outlet section 416 are further compressed using an outlet section adjustment plate 541. Outlet section adjustment plate 541 uses either a series of adjusting screws 542 or pneumatic motor (not shown) to adjust the pressure inside outlet section 416. Unused pulps, the remainders of fruits after the juice are squeezed out, are collected in pulp collection chamber 417. Additional fruit juice is further compressed and drained out via drainer 418.

Figure 6:
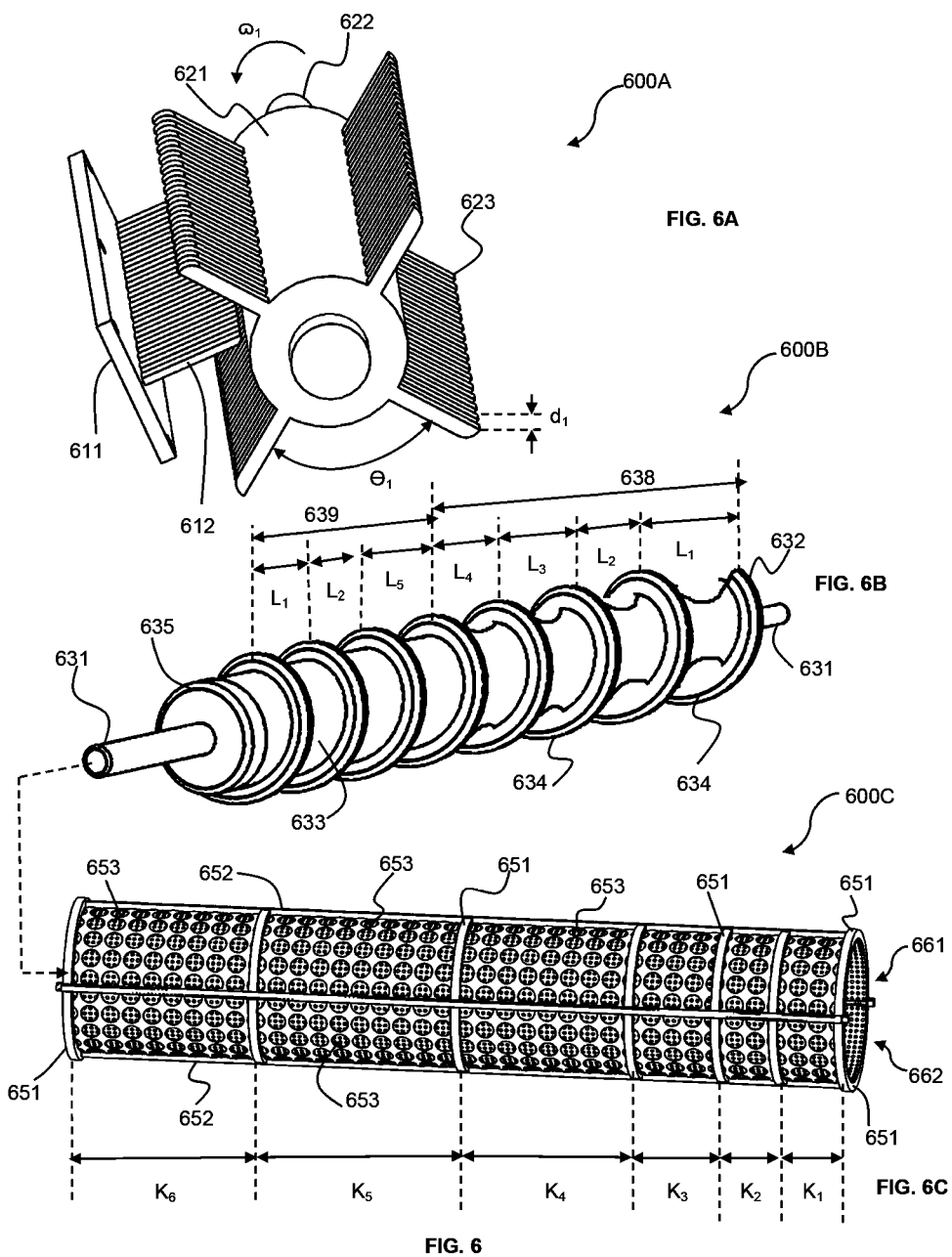
FIG. 6A is a three-dimensional (3D) perspective diagram illustrating a precutter of the screw press juicing apparatus in accordance with an exemplary embodiment of the present invention.
FIG. 6B is a three-dimensional (3D) perspective diagram illustrating the novel geometrical shape of the screw press in accordance with an exemplary embodiment of the present invention.
FIG. 6C is a three-dimensional (3D) perspective diagram illustrating a filtering screen of the screw press in accordance with an exemplary embodiment of the present invention

Next referring to FIG. 6A, a three-dimension (3D) diagram of a precutter 600A in accordance with an exemplary embodiment of the present invention is illustrated. Precutter 600A includes a fixed array of cutting blades 610 and a rotating array of cutting blades 620. Fixed array of cutting blades 610 includes a base 611 affixed to the wall of precutter section 412. Rotating array of cutting blades 620 includes a cylindrical precutter body 621 and a precutter axle that is at the center of precutter body 621. Around a circumferential surface of precutter body 621, four array of cutting device 623 are projected out. Each array of cutting device 623 is positioned at an angle $\Theta=60°$ relative to one another. Each cutting device 623 is at a distance d from one another. Rotating array of cutting blades 620 is intertwined with fixed array 610. As rotating array of cutting blades 620 is rotated at an angular velocity $\omega$ (rpm), fruits are cut into small pieces.

Referring next to FIG. 6B, a three-dimension (3D) diagram of a screw press 600B in accordance with an exemplary embodiment of the present invention is illustrated. Structurally, from inside to outside, screw press 600B is made of steel and includes a screw press rotary axle 631, a crew press surface 633, and a screw threads 634. Surface body 633 is a varying degree of concavity from a front end 632 to a rear end 635. The concavity of body surface 633 decreases toward rear end 635; where $L_1$ is the distance between first screw thread and second screw thread, $L_2$ is that between second and third screw thread, $L_3$ is between third and fourth screw thread, $L_4$ is between fourth and fifth, $L_5$ is between the fifth and the sixth screw thread, $L_6$ is between the sixth and the seventh screw thread, and $L_7$ is between the seventh and the eighth screw thread. The distances $L_1$-$L_7$ between two adjacent threads 634 also decreases from front end 632 toward rear end 635. That is, $L_1>L_2>L_3>L_4>L_5>L_6>L_7$. The concavity of surface body 633 is greatest at distance $L_1$ and continually decreases to be smallest at $L_4$. This is defined as a collection stage 638. From $L_5$ to $L_7$, surface body 633 is a constant and a straight line so that screw press 600B has a cylindrical shape from $L_5$ to rear end 635, which is defined as a juicing stage 639.

Referring next to FIG. 6C, a three-dimension (3D) diagram of a filter screen 600C in accordance with an exemplary embodiment of the present invention is illustrated. In various embodiments of the present invention, filter screen 600C has a cylindrical shape that can divided evenly into an upper half 661 and a lower half 662. Circumferential ribs 651 and longitudinal ribs 652 are used to reinforce screen filter 600C. The space between circumferential ribs 651 and longitudinal ribs 652 is a sheet of metal folded into a cylindrical shape. The cylindrical sheet of metal is punctuated with openings 653 into an arrays of circles with tiny holes which allow fruit juice to pass by. As seen from FIG. 6C, the distances $K_1$-$K_6$ between two adjacent circumferential ribs 651 vary from frond end 632 to rear end 635, which match with those of $L_1$-$L_7$. That is, $K_1>K_2>K_3>K_4>K_5>K_6$. Upper half 661 and a lower half 662 are separably connected together to contain screw press 600B inside. After used, filter screen 600C is separated into upper half 661 and lower half 662 and screw press 600B is taken out for cleaning.

Figure 7:
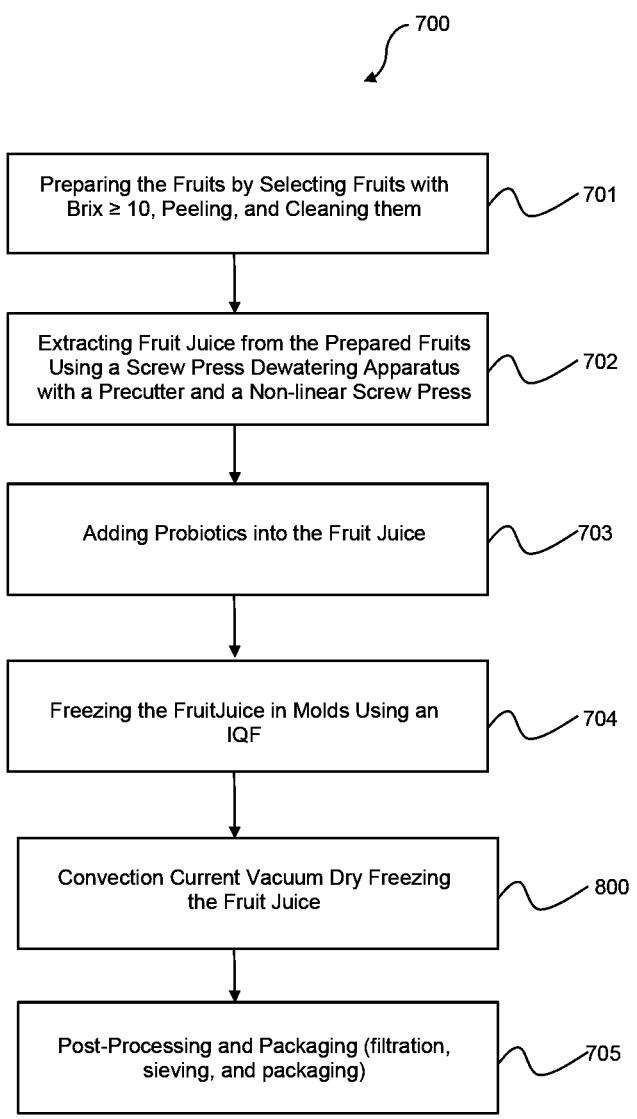
FIG. 7 is a flow chart illustrating a process of preparing concentrated fruit juice powder using a convection current vacuum freeze drying apparatus in accordance with an exemplary embodiment of the present invention.

Now referring to FIG. 7, a flow chart of a process of preparing concentrated fruit juice powder 700 using a convection current vacuum freeze drying apparatus 200 and fruit juice extracting apparatus 400 is illustrated in accordance with an exemplary embodiment of the present invention. First, fruits are prepared, their juice are extracted, probiotics are added to increase digestive and other health benefits, the mixture of fruit juice and probiotics are frozen in blocks, then they are vacuum freeze drying by a convection current vacuum freeze apparatus, and finally the vacuum freeze dried fruit juice powder is obtained and post-processed such as filtering and packaging.

At step 701, fruits are selected using a predetermined quality guideline. The predetermined quality guideline includes selecting only fruits that are healthy, heaving, without any spoilage darkened spots, solid cores without any sign of hollowness. Most importantly, fruits selected must have a Brix level of at least 10°. The selected fruits are peeled, removing the rinds, cleaned thoroughly.

At step 702, the selected and cleaned fruits are extracted using a screw press juicing apparatus. In many aspects of the present invention, step 702 is implemented by screw press juicing apparatus 400 as described above in FIG. 4-FIG. 6. Using the non-linear surface body of screw press juicing apparatus 400, the extraction efficiency of the present invention is at 98%. The capacity of fruit juice extracting apparatus 400 is again at 500 kg/hour at velocity of 10 to 30 rpm.

After the juice are obtained, at step 703, probiotics are added. In the implementation of step 703, probiotics *lactobacillus, streptococcus*, and *bifidobacterium* are added at an amount of 0.75 g to 1 g of *lactobacillus, streptococcus*, and *bifidobacterium* per every 100 g of fruit juice.

Next, at step 704, the mixture of fruit juice and probiotics are pre-freezing in blocks using molds. Step 704 can be implemented using pre-freezing individual quick freezer (IQF) 130. Fruit juice and probiotics are poured into rectangular molds and pre-frozen at to −40° C. to −35° C. for 25 minutes to 30 minutes.

At step 800, the blocks of frozen fruit juice are vacuum freeze dried using a convection current vacuum freeze drying apparatus as described in the application Ser. No. 16/258,639, entitled "Fully Automatic Convection Current Freeze Drying Method", filed on Jan. 27, 2019 which is a continuation application of application Ser. No. 16/371,097, entitled, "Convection Current Freeze Drying Apparatus and Method of Operating the Same", filed on Mar. 31, 2019. These patent applications are incorporated here by reference in its entirety to provide continuity of disclosure. Step 800 is described in detailed below in FIG. 8.

Finally, at step 705, the concentrated fruit juice powder is post-processed. In various aspects of the present invention, step 705 is implemented by filtration, sieving, and packaging.

Figure 8:
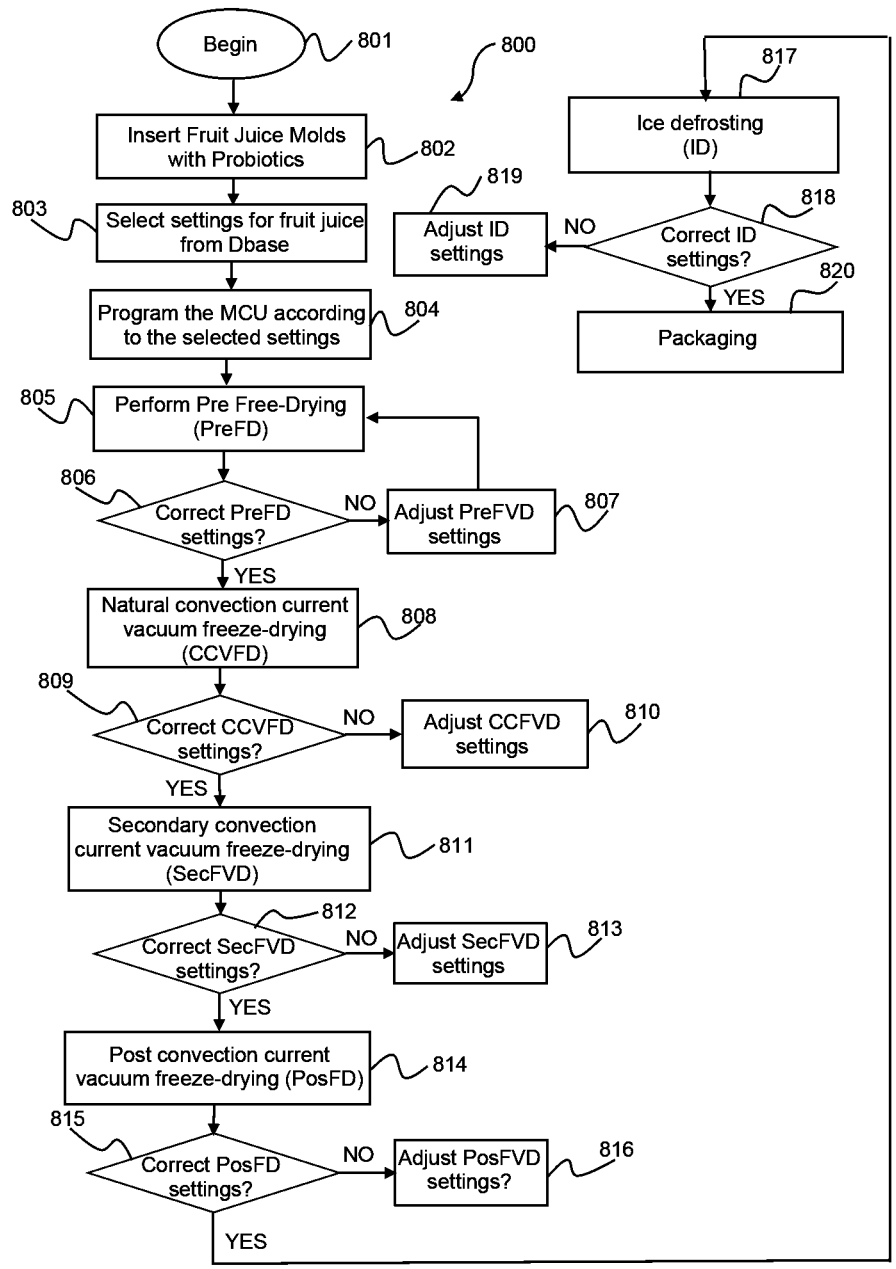
FIG. 8 is a flow chart illustrating a process of operating a convection current vacuum freeze drying apparatus for preparing concentrated fruit juice powder in accordance with an exemplary embodiment of the present invention.

Next referring to FIG. 8, a flow chart illustrating a method 800 of operating convection current vacuum freeze drying apparatus 200 ("apparatus 200") in accordance with an exemplary embodiment of the present invention is illustrated. The operation of apparatus 200 illustrated by process 800 further includes the following operational steps: performing the preliminary convection current vacuum free drying (pre CCVFD) 801-804, performing the primary convection current vacuum free drying (pri CCVFD) 805-808, performing secondary convection current vacuum free drying (sec CCVFD) 809-812, performing post convection current vacuum free drying (post CCVFD) 813-816, and performing ice defrosting 817-820.

In the pri CCFVD operational steps 801-804, the refrigerator unit 230 is started to collect cold air inside and dryer unit 210 and ice condenser unit 220. Discharge water valve 214V and ice condenser discharge valve 225V are closed. Cooling water pump for vacuum pump unit 243P and cooling water valve 243V are switched off. The water circulation in dryer unit 210 is closed off. At the same time, freeze dried chamber-heater hot water valve 212V is switched on. Fans in cooling tower unit 240 is turned on. Cooling water pump 235P is also turned on to cool compressors 231. After compressor 231 are turned on, the temperatures of a plurality of elongate heat exchange tubes with radially arranged fins 226 are recorded via temperature transmitter (also known as thermometer or thermal coupler) 229. Controller unit 201 observes whether the temperature is lowered by 5° C. If it does not, alarm signals are sent out. Controller unit 201 sends diagnostic signals to inspect refrigerator unit 230. If refrigerator unit 230 is normal, trays 211 are loaded with blocks of frozen fruit juice. In some embodiments of the present invention, conveyors (not shown) will thrust trays 311 loaded with the selected fruit juice deep inside dryer unit 210.

At step 801, method 800 begins by cleaning and checking all the electrical as well as mechanical connections between the component units are correct and secured as described in FIG. 2 above. All valves, e.g., 212V, 214V, 223V, 225V, 228, 243V, 263V, are released to clear all residual water out of the system and ice defrosting step is performed. In other words, step 801 involves all necessary preparatory steps prior to the vacuum freeze drying process begins. In many aspects of the present invention, step 801 may involve calibration procedure to ensure proper and accurate performance of apparatus 200 in accordance with ISO standards such as ISO 13408. The preparatory steps may include temperature tests such as shelves temperatures tests with and without loads, steam in place (SIP) test to ensure proper sterilization of apparatus 200, and tests for vacuum pump unit 250, etc.

At step 802, fruits in blocks of frozen fruit juice prepared by process 700 above to be vacuum freeze dried is selected. The juices of fruits are first substantially extracted using fruit extracting apparatus 400 as described in FIG. 4 to FIG. 6 above. The frozen blocks made from molds of fruit juice are laid in trays 211. Controller unit 201 and database 202 are informed and programmed to perform the next steps accordingly.

Next, at step 803, specific settings for fruits in step 801 are located from a preconfigured database. The preconfigured database is a database built from careful and thorough prior clinical tests for fruit juice. Clinical tests are performed to obtain specific settings include eutectic temperatures ($T_{eu}$), critical temperatures ($T_C$), triple point or sublimation temperatures ($T_{SUB}$), optimal temperatures ($T_{opt}$), pressures, durations for each phase (t sec), etc. for fruit juice. In many aspects of the present invention, step 803 is implemented by database 202. The specific settings for fruit juice are stored in database 202 such as Look-Up Table (LUT); Read and Write memory; CD-ROM; DVD; HD-DVD; Blue-Ray Discs; etc.; semiconductor memory such as RAM, EPROM, EEPROM, etc.; and/or magnetic memory such as hard-disk drive, floppy-disk drive, tape drive, MRAM, etc. A simple exemplary database in accordance with an exemplary embodiment of the present invention is listed in Table 2 below. Please note that Table 2 is only a simplified example of the database of the present invention. In reality, the database can have other settings listed above which are necessary to carry out an optimal convection current freeze drying process for fruits.

TABLE 2

A Simplified Example of a Vacuum Freeze Drying Database

| Address | Products | Triple Point Temperatures | Pressures |
|---|---|---|---|
| 1 | Pineapple (*Ananas comosus*) | <−20° C. | <0.5 Torr. |
| 2 | Beetroots (*Beta vulgaris*) | <−20° C. | <0.5 Torr. |
| 3 | Durian (*Durio zibethinus*) | <−18° C. | <0.5 Torr. |
| 4 | Kumquats (*Fortunella japonica*) | <−30° C. | <0.1 Torr. |
| 5 | Apples (*Malus dometica*) | <−30° C. | <0.1 Torr. |
| 6 | Pennywort (*Centella asianatica*) | <−20° C. | <0.2 Torr. |
| 7 | Passion Fruits (*Passiflora edulis*) | <−20° C. | <0.5 Torr. |
| 8 | Ambarella Fruits (*Spondias Durcis*) | <−20° C. | <0.2 Torr. |
| 9 | Coconut Milk (*Cocos nucifera*) | <−20° C. | <0.5 Torr. |
| 10 | Soursop fruits (*Annona muricata*) | <−20° C. | <0.5 Torr. |
| 11 | Banana (*Musa*) | <−20° C. | <0.5 Torr. |
| 12 | Jack fruits (*Artocarpus heterophylus*) | <−20° C. | <0.5 Torr. |
| 13 | Mango (*Mangifera indica*) | <−20° C. | <0.5 Torr. |
| 14 | Dragon fruits (*Hylocerus costaricensis*) | <−20° C. | <0.5 Torr. |

Next, at step 804, after all the settings are located in the database, a controller unit is programmed with the above settings. In many exemplary embodiments of the present invention, step 804 is implemented by controller unit 201 which includes, but not limited to, a desktop computer, a laptop computer, a Programmable Logic Controller (PLC), a Supervisory Control and Data Acquisition (SCADA), or any other type of microprocessors or programmable logic array (PLA).

More specifically, in the pri CCFVD operational steps 805-807, the refrigerator unit 230 is started to collect cold air inside and dryer unit 210 and ice condenser unit 220. Discharge water valve 214V and ice condenser discharge valve 225V are closed. Cooling water pump for vacuum pump unit 243P and cooling water valve 243V are switched off. The water circulation in dryer unit 210 is closed off. At the same time, freeze dried chamber-heater hot water valve 212V is switched on. Fans in cooling tower unit 240 is turned on. Cooling water pump 235P is also turned on to cool compressors 231. After compressor 231 are turned on, the temperatures of a plurality of elongate heat exchange tubes with radially arranged fins 226F are recorded via temperature transmitter (also known as thermometer or IoT thermometer) 229. Controller unit 201 observes whether the temperature is lowered by 5° C. If it does not, alarm signals are sent out. Controller unit 201 sends diagnostic signals to inspect refrigerator unit 230. If refrigerator unit 230 is normal, trays 211 are loaded with fruits listed in Table 1. In some embodiments of the present invention, conveyors (not shown) will thrust trays 211 loaded with the selected fruit juice deep inside dryer unit 210.

Continuing with operational steps pre CCVFD 805-807 and FIG. 2, tray temperature transmitters 215 and 216 are moved into position to record tray temperatures during the convection current vacuum freeze drying process. The door(s) of dryer unit 210 are automatically closed by turning on front door switch 217 and rear door switch 218. Sensors will alarm controller unit 201 if doors are not hermetically closed. Cooling water valve 243V and cooling water pump 243P are switched on to cool vacuum pump unit 250. Vacuum isolating valve 223V is tightly switched off so that when vacuum pump unit 250 is turned on it will not be overloaded. Controller unit 201 observes when vacuum pump unit 250 is overloaded. If vacuum pump is overloaded, controller unit 201 tightens up vacuum isolating valve 223V and checks for overloading again. Some time-outs can be provided to apparatus 200 during correction steps. This correction repeats until vacuum pump unit 250 is not overloaded. When this condition happens, controller unit 201 turns on vacuum pump unit 223V by 5% per minute until vacuum pump unit 250 is fully throttled on. At this time, the pre CCVFD operational steps 805-807 end.

At step 805, a preliminary convection current vacuum free drying step (pre CCVFD) is performed. In the implementation of step 805, all the valves and flow meters are turned off so that all main units 210 to 260 are isolated from one another. First, heater unit 260 and the vacuum pump unit 250 are turned off because it is not required in the early stages of the process. Meanwhile, ice condenser unit 220, refrigerator unit 230, and cooling tower unit 240 are turned on. Ice condenser unit 220 is slowly set to a temperature less than the initiation temperature of 5° C. Once this initiation temperature is achieved for a first predetermined time duration, fruits listed in Table 1 is loaded either manually or by an automatic conveyor which is controlled by controller unit 201. When all trays 211 in dryer unit 210 are finished loading, vacuum pump unit 250 is turned on. Cooling tower valve 243V and vacuum pump isolating valve 223V are turned off. Next, a second predetermined time duration is set by controller unit 201. Finally, vacuum pump unit 250 is checked for overloading. If vacuum pump unit 250 is overloaded, controller unit 201 will reset the second predetermined time duration until the overloading condition is cleared. Then, vacuum pump isolating valve 223V connecting vacuum pump unit 250 and ice condenser unit 220 is slowly opened at a predetermined rate of approximately 5% per minute until this vacuum pump isolation valve 223V is fully opened. Thus, the objective of the pre CCVFD operational step is to set up the initial temperature (less than 5° C.) and slowly turning on vacuum pump unit 220 at a predetermined rate of 5% per minute.

At step 806, the initiation temperature, the first predetermined time duration, the second predetermined time duration, the rate, and other settings of the preliminary convection current vacuum free drying are sensed by sensors and sent to a controller unit. The controller unit compares these observed setting data with those stored in the database and determines whether the preliminary CCVFD is performed correctly. In many embodiments of the present invention, step 806 can be implemented by controller unit 201, database 202, and sensors such as, 215, 216, 219, 225M, 229, 252, 262M, 263, 264, etc. which can be observed remotely by devices such as cell phones, laptops, computers, etc. that are connected to the network. In a preferred embodiment, convection current vacuum freeze drying apparatus 200 of the present invention is network-based. In some embodiments, convection current vacuum freeze drying apparatus 200 of the present invention is a stand-alone machine which is not connected to any network.

At step 807, the settings of the preliminary CCVFD is sensed by the sensors. Similar to step 806, the sublimation temperature ($T_{SUB}$), the third predetermine time duration, the state of the valves are constantly observed. In many embodiments of the present invention, all sensors are network-based devices. Step 807 can be implemented by, controller unit 201, database 202, sensors such as, 215, 216, 219, 225M, 229, 252, 262M, 263, 264, etc. that are connected to a network such as the industrial wireless sensor network (IWSN).

Next at step 808, a primary convection current vacuum free drying (pri CCVFD) operational step is performed. In the primary convection current vacuum drying operational step, the controller unit brings the ice condenser unit well below the triple point (sublimation) temperature of fruits for a third predetermined time duration. Please see Table 1. As an example, when fruits are selected, the sublimation temperature ($T_{SUB}$) is maintained at −20° C. for 11 hours. A vacuum pipe 223V connecting the ice condenser unit 220 and the vacuum pump unit 250 is turned off so that the cold vapors from the ice condenser unit 220 are prevented from entering the vacuum pump unit 250. It will be noted that the eutectic temperatures ($T_{eu}$) of fruit juice are taken into consideration by the controller unit to avoid eutectic melt down of fruit juice. Step 808 can be implemented by controller unit 201, database 202, vacuum freeze dried chamber 210, ice condenser unit 220, refrigerator unit 230 of apparatus 200 described above in FIG. 2.

In the implementations of steps 805-808, the temperatures on convection current heat exchange tubes with fins 226F are lowered and maintained at −20° C. The pressure inside ice condenser unit 220 is lowered to less than 5 Torricelli (torr.). This temperature and pressure are checked at a predetermined time duration of 10 minutes interval. Current intensities of current transformer transmitter 252 are reported. Tray temperatures from tray temperature transmitters 215 and 216 are also observed.

If the process proceeds normally, at −20° C. and 5 Torr., the water in frozen fruit juice blocks in trays 311 will be frozen solid for about an hour. Then, valve 212V is turned on to circulate hot water to pipes (not shown) underneath trays 211 in order to bring the tray temperature to 5° C. for 11 hours. This time duration is specific to fruits. See Table 2. Controller unit 201 searches database 202 to select the correct this time duration for fruit juice. During this time duration, all frozen water will be transformed directly to gaseous phase without becoming liquid first.

At step 809, the settings of the primary CCVFD is sensed by the sensors. Similar to step 808, the sublimation temperature, the third predetermine time duration, the state of the valves are constantly observed. In many embodiments of the present invention, step 809 can be implemented by controller unit 201, database 202, and sensors such as, 215, 216, 219, 225M, 229, 252, 262M, 263, 264, etc.

At step 810, if any of the settings is not correct, the controller unit or any devices that are connected to the network can alarm and adjust the settings so that the optimal primary CCVFD results can be achieved. In many embodiments of the present invention, step 810 can be implemented by controller unit 201, database 202, and sensors such as, 215, 216, 219, 225M, 229, 252, 262M, 263, 264, etc.

At step 811, after correct the settings of the primary CCVFD, the controller unit goes to the secondary convection current vacuum freeze-drying (sec CCVFD) step. A time-out may be imposed on the system until all incorrect settings are adjusted. In many embodiments of the present invention, step 811 can be implemented by controller unit 201.

At step 812, secondary convection current vacuum freeze drying (sec CCVFD) step is performed. In this step, the pressure is lowered to the triple point (sublimation) and a fourth time duration is set. In the case of fruit juice is being freeze dried this fourth time period is 10 minutes. Then the tray temperatures are increased by 5° C. step by a fifth time duration of about 30 minutes. Finally, tray temperatures are held at 5° C. for a sixth predetermine time duration of about 8 hours so that all remaining frozen solutes in fruit juice change directly into vapor phases without becoming liquid. In step 812, heater unit is turned on and the all the valves are connecting the dryer unit and the heater unit are opened. Step 812 can be implemented by controller unit 201, database 202, vacuum freeze dried chamber 210, ice condenser unit 220, refrigerator unit 230, cooling tower unit 240, vacuum pump unit 250, and heater unit 260 of apparatus 200 described above in FIG. 2.

At step 813, the settings of the secondary CCVFD is sensed by the sensors. Similar to step 812, the sublimation temperatures ($T_{SUB}$), pressures, tray temperatures, and the predetermine time durations are constantly observed. In many embodiments of the present invention, step 813 can be implemented by controller unit 201, database 202, and sensors such as, 215, 216, 219, 225M, 229, 252, 262M, 263, 264, etc.

To summarize steps 810-813, operation step (sec CCVFD) is very similar to the pri CCVFD steps 804-809 except that the temperatures inside dryer unit 210 are increased to about 65° C. by turning on the circulation of hot water from heater unit 260. Trays 211 are heated up by the vapors from fruit juice during the convection current vacuum freeze drying process. The sec CCVFD step aims is to vaporize the remaining water from the fruit juice.

Now referring to step 814, a post convection current vacuum freeze drying (post CCVFD) operational step is performed. In this step, the refrigerator unit, the vacuum pump unit, the cooling tower unit are turned off in that specific order for a seventh predetermined time duration prior to the release of the vacuum unit valve to avoid damaging the dried fruit juice. In many aspects of the present invention, step 814 can be implemented by controller unit 201, database 202, vacuum freeze dried chamber 210, ice condenser unit 220, refrigerator unit 230, cooling tower unit 240, vacuum pump unit 250, and heater unit 260 of apparatus 200 described above in FIG. 2.

At step 815, the settings of the post CCVFD is sensed by the sensors. Similar to step 812, the temperatures, flow meters, pressures, and the predetermine time durations are constantly observed. In many embodiments of the present invention, step 815 can be implemented by controller unit 201, database 202, and sensors such as, 215, 216, 219, 225M, 229, 252, 262M, 263, 264, etc.

At step 816, if any of the settings is not correct, the controller unit or any devices that are connected to the network can alarm and adjust the settings so that the optimal post CCVFD results can be achieved. After correct the settings of the post CCVFD, the controller unit continues step 814. A time-out may be imposed on the system until all incorrect settings are adjusted. In many embodiments of the present invention, step 816 can be implemented by controller unit 201, database 202, and sensors such as, 215, 216, 219, 225M, 229, 252, 262M, 263, 264, etc.

Post convection current vacuum freeze drying (post CCVFD) steps 814-816 are performed in apparatus 200. First, vacuum isolating valve 223V is turned off to prevent oils of vacuum pump unit 250 from entering ice condenser unit 220. Compressors 231 and cooling water pump 235P are switched off. Then freeze dried chamber-heater hot water valve 212V and freeze dried chamber heater hot water pump 212P are turned off. Cooling water pump 243P is turned off. At this moment, heater unit 260 ceases to provide heat energy to dryer unit 210. Thirty seconds (30 seconds) from the time vacuum isolating valve 223V is completely turned off, vacuum pump unit 250 is turned off. Cooling water valve 343V is turned off and cooling water pump 243 is locked. Then fans in cooling tower unit 240 are turned off. Vacuum release valve 228 is opened to bring the pressure inside ice condenser unit 220 to the atmospheric pressure (1 atm). A one-minute time-out is given to apparatus 200 before discharge water valve 214V is opened. Front door switch 217 and rear door switch 218 are released. Vacuum freeze fruit juice powder can now be collected and packaged. Now, controller unit 201 can calculate the amount of water extracted from fruit juice by subtracting the amount of water recorded on flow meter 225M from that on flow meter 262M.

In some implementations, method 800 may include step 817, an ice defrosting (ID) operational step is performed. In this step, water vapors from fruit juice after sublimation is forwarded to the heater unit to use the latent heat to defrost the ice crystals formed on the fins of the heat exchange tubes.

At step 818, the settings of the ID are sensed by the sensors. Similar to step 817, the temperatures of the heater unit are sensed. In many aspects of the present invention, step 818 can be implemented by controller unit 201, database 202, vacuum freeze dried chamber 210, ice condenser unit 220, refrigerator unit 230, cooling tower unit 240, vacuum pump unit 250, and heater unit 260 of apparatus 200 described above in FIG. 2.

At step 819, if any of the settings is not correct, a controller unit or any devices that are connected to the network can alarm and adjust the settings so that the optimal defrosting results can be achieved. In many embodiments of the present invention, step 819 can be implemented by controller unit 201, database 202, and sensors such as, 215, 216, 219, 225M, 229, 252, 262M, 263, 264, etc.

At step 820, after correct the settings of the ID, the controller unit continues step 818. A time-out may be imposed on the system until any of the incorrect settings are adjusted and all the ice are cleared. In many embodiments of the present invention, step 820 can be implemented by controller unit 201.

Still referring to FIG. 8, next ice defrosting (ID) steps 818-820 are performed in apparatus 200. First, water level of heater unit 260 is measured by high water level sensor 264 and low water level sensor 265. If the water level is low, water can be refilled via feed water tube 262 and feed water valve 262V. Three-phase heating elements 261 of heater unit 260 are turned on to defrost all the ice in ice condenser unit 220. The temperature or amount of heat to defrost depend on the amount of ice formed inside ice condenser unit 220. In some situations, this temperature can reach 90° C. After the ice defrosting operation is complete, three-phase heating elements 261 are turned off. Circular heat water pump 224P is turned off. The efficiency of the convection current vacuum freeze drying process can be calculated by subtracting the amount of input water provided to heater unit 260 measured on flow meter 262M from the amount of output water measured on flow meter 225M.

Finally at step 821, the entire convection current vacuum freeze drying process 800 ends.

Implementations of process 800 disclosed above achieve the following objectives:

A precise step-by-step procedure including predetermined time durations, temperatures, pressure, flow rate, cooling rates are constantly observed and adjusted to that optimal vacuum freeze drying process can be achieved for fruit juice.

A fully automatic and control with minimal human involvements so that errors can be avoided, good dried fruit juice can be guaranteed, and efficiency can be achieved.

High cooling rate is achieved due to the use of the natural convection currents of the present invention.

Aspects of the present invention are described above with reference to flowchart illustrations and/or block diagrams of methods, apparatus (systems) and computer program fruit juice according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a apparatus, such that the instructions, which execute via the processor of the computer or other programmable data processing apparatus, create means for implementing the functions/acts specified in the flowchart and/or block diagram block or blocks.

Computer program code for carrying out operations for aspects of the present invention such as process 700 and 800 may be written in any combination of one or more programming languages, including an object oriented programming language such as Python, Java, Smalltalk, C++, Ladder logic, FBD, ST, IL, SFC, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS 100 system for preparing concentrated fruit juice powder
103 Mechanical connectors between units of the system 100
104 Communication channels between controller unit and the system
110 peeling and cleaning apparatus
120 fruit juice extracting apparatus
130 pre-freezing individual quick freezer (IQF)
200 An exemplary convection vacuum freeze drying apparatus
201 Controller unit of the exemplary CCVFD
202 Database of the exemplary CCVFD
203 Mechanical connectors between units of the exemplary CCVFD
204 Communication channels of the exemplary CCVFD
211 Freeze Dried Trays (trays)
212 Hot water pipe
212V Freeze dried chamber-heater hot water valve
212P Freeze dried chamber-heater hot water pump
213 Return water pipe
214 Discharge water pipe
214V Discharge water valve
215 First tray temperature transmitter
216 Second tray temperature transmitter
217 Front door switch
218 Rear door switch
219 Vacuum pressure transmitter
220 Convection current condensing unit (Condenser)
221 Large ice condenser and freeze dried chamber connection pipe
222a Liquid refrigerant pipe
222b Gaseous refrigerant pipe
223 Vacuum pipe
223V Vacuum isolating valve
224 Ice condenser heater hot water pipe
224V Ice condenser heater hot water valve
224P Ice condenser heater hot water pump
225 Ice condenser discharge valve
225M Ice condenser discharge flow meter
225V Ice condenser discharge valve
226 Convection current heat exchanging tubes without fins
226F Convection current heat exchanging tubes with fins
227 Expansion capillary tubes
228 Vacuum release valve
229 Ice condenser temperature transmitter
230 Refrigerator unit
231 Compressor
232 Refrigerant container
233 Liquid refrigerant heat exchanger
234 Refrigerant heat exchanger
235 Cooling water pipe
235P Cooling water pump
240 Cooling tower unit
241 Feed water pipe
241V Feed water valve
242 Hot water returning pipe
243 Cooling water pipe for vacuum pump unit
243P Cooling water pump for vacuum pump unit
243V Cooling water valve for vacuum pump unit 250 Vacuum pump unit
251 Vacuum input pipe
252 Current transformer transmitter of the vacuum pump unit
260 Water heater unit (heater)
261 Three-phase heating element
262 Feed water pipe for heater
262M Feed water flow meter for heater
262V feed water valve for heater
263 Heater temperature transmitter
264 High water level sensor
265 Low water level sensor
300 Internal structure of convection current ice condenser unit
301 Rectangular base
310 Input reinforcement plate for top array
311 First elongate heat exchange tube with fins
312 Curved connecting tubes for top array
320 Input reinforcement plate for bottom array
322 Second elongate heat exchange tube without fins
322a Cold gas input from the refrigerator unit
322b Warm liquid output
323 Curved connecting tube for bottom array
326 Bottom array of second elongate heat exchange tubes
326F Top array of first elongate heat exchange tubes
400 screw press juicing apparatus
401 support base
402 screw press motor base
403 precutter motor base
411 hopper
412 precutter section
413 inlet section
414 fruit juice collection pan
415 fruit juice siphon (chute)
416 outlet section
417 pulp (cake, or solids) collection chamber
418 drain
423 precutter motor
424 precutter motor driving wheel
425 precutter motor driven (output) wheel
426 precutter motor belt
432 screw press motor
433 screw press motor driving wheel
434 screw press motor output wheel
435 screw press motor belt
500 screw press section
501 screw press opening
502 back pressure plate
511 fixed cutting component
512 rotating cutting component
520 screen filter (cylindrical)
521 upper half filter screen
522 lower half filter screen
530 screw press
531 screw press axle
532 screw press front end
533 screw threads
534 body surface
535 screw press rear end
541 outlet section adjustment unit
542 series of adjusting screws
600A precutter
610 precutter fixed array of cutting blades
611 precutter fixed base
612 fixed array of cutting blades
620 precutter rotating array of cutting blades
621 cylindrical body
622 precutter axle
623 precutter array of rotating blades
600B screw press
631 screw press rotary axle
632 screw press front end
633 screw threads
634 surface body
635 rear end
$L_1$-$L_7$ pitch or distance between two adjacent threads
600C filtering screen
651 circumferential ribs
652 longitudinal ribs
653 circular openings
661 upper half of filter screen
662 lower half of filter screen
$K_1$-$K_6$ variable distance between circumferential ribs.

What is claimed is:

1. A concentrated fruit juice powder obtained from a process comprising following steps:
   (a) selecting and preparing fruits by predetermined quality guidelines;
   (b) extracting fruit juice from said fruits by feeding selected fruits from step (a) into a screw press juicing apparatus having a precutter and a screw press whose body surface varies non-linearly from a front end to a rear end;
   (c) adding probiotics into said fruit juice;
   (d) freezing said fruit juice mixed with said probiotics in frozen fruit juice molds using an individual quick freezer (IQF) to obtain frozen fruit juice blocks; and
   (e) vacuum freezing said frozen fruit juice molds using a convection current vacuum freeze drying apparatus.

2. The concentrated fruit juice powder of claim 1 wherein said fruits comprise ambarella fruits, pennyworts (*Centella asianatica*), coconut juice, pineapples, kumquats, durians, passion fruits, and soursops.

3. The concentrated fruit juice powder of claim 1 wherein said fruits comprise beetroots, passion fruits, apples, and/or a mixture thereof.

4. The concentrated fruit juice powder of claim 1 wherein said predetermined quality guidelines comprise:
   selecting said fruits that have a Brix level of at least 10; and
   performing visual inspection to select said fruits that are ripe, have green color, heavy with solid cores, and free of spoilage spots.

5. The concentrated fruit juice powder of claim 1 wherein said probiotics comprises *lactobacillus, streptococcus*, and *bifidobacterium*.

6. The concentrated fruit juice powder of claim 5 wherein an amount of 0.75 g to 1 g of *lactobacillus, streptococcus*, and *bifidobacterium* are added to every 100 g of said fruit juice.

7. The concentrated fruit juice powder of claim 1 further comprising adding malto syrup into said fruit juice of step (c) at a weight ratio of 10%-20%.

8. The concentrated fruit juice powder of claim 1 further comprising adding sugar into said fruit juice at said step (c) of adding probiotics into said fruit juice.

9. The concentrated fruit juice powder of claim 1 screw press juicing apparatus further comprises:
   a hopper for receiving said fruits;
   said precutter, mechanically coupled to said hopper, operable to cut said fruits into small pieces;
   said screw press having said front end, said body surface, said rear end, and screw threads that wrap around an outer circumference of said body surface, and wherein said screw threads have a pitch that varies along said body surface from said front end to said rear end;
a filter screen, substantially enveloping said screw press inside, having a plurality of openings designed to pass said fruit juice therethrough;
a fruit juice container, mechanically coupled to said filter screen and said screw press, operable to receive said fruit juice that are passed through said plurality of openings; and
an output section, coupled to said screw press, operable to receive remaining pulps of said fruits.

10. The concentrated fruit juice powder of claim 9 wherein said screw press is divided into a collection stage and a juicing stage in accordance with said pitch of said screw threads and a geometrical shape of said body surface, wherein in said collection stage, said pitch is lower than that in said juicing stage and wherein said body surface is a concave surface in said collection stage whereas said surface is a straight line so as said screw press forms a cylindrical shape in said juicing stage.

11. The concentrated fruit juice powder of claim 10 wherein said filter screen further comprises circumferential ribs and longitudinal ribs and wherein distances between two consecutive circumferential ribs decreases from said collection stage to said juicing stage.

12. The concentrated fruit juice powder of claim 1 wherein said vacuum freezing step further comprises:
loading specific freeze drying settings for a specific fruit among said fruits from a database into a controller unit;
using said controller unit to cause said convection current vacuum freeze drying apparatus to perform said vacuum freezing step in accordance with said specific freeze drying settings for said specific fruit;
measuring real-time operational parameters from said convection current vacuum freeze drying apparatus during said vacuum freezing step is performed;
comparing said specific freeze drying settings for said specific fruit with said real-time operational parameters to obtain operational differences;
if said operational differences are less than a predetermined error range, continuing said vacuum freezing step until said extracting fruit juice step is finished; otherwise, adjusting said real-time parameters of said convection current vacuum freeze drying apparatus until said differences in operations are less than said predetermined error range; wherein said convection current vacuum freeze drying apparatus further comprises a dryer chamber unit, a convection current condenser unit comprising a plurality of elongate heat exchange tubes each having fins arranged around an outer circumference of said plurality of elongate heat exchange tubes, a refrigerator unit, a cooling tower unit, a primary vacuum pump unit, and a heater unit.

13. A system for preparing a fruit juice concentrated powder, comprising:
a screw press juicing apparatus having a precutter and a screw press whose body surface varies non-linearly from a front end to a rear end of said screw press;
a convection current vacuum freeze drying apparatus comprising:
a dryer chamber unit comprising a plurality of trays for depositing fruit juice blocks to be freeze dried;
a convection current condenser unit, mechanically connected to said dryer chamber unit, comprising a plurality of first elongate heat exchange tubes, each of said plurality of first elongate heat exchange tubes having fins arranged around an outer circumference of each of said plurality of first elongate heat exchange tubes, wherein said plurality of first elongate heat exchange tubes substantially fill an internal volume of said convection current condenser unit;
a refrigerator unit mechanically connected to said convection current condenser unit, operable to provide a cold refrigerant gas to said plurality of first elongate heat exchange tubes;
a cooling tower unit mechanically connected to said convection current condenser unit;
a primary vacuum pump unit, mechanically connected to said convection current condenser unit and said cooling tower unit, operable to provide a vacuum pressure to said convection current condenser unit; and
a heater unit mechanically connected to provide a heat energy to both said dryer chamber unit and said convection current condenser unit;
a controller unit; and
a database electrically coupled to communicate with said controller unit, wherein said controller unit is electrically coupled to control and receive sensed operational settings from said dryer chamber unit, said convection current condenser unit, said refrigerator unit, said cooling tower unit, said primary vacuum pump unit, and said heater unit, wherein said database is configured to store predetermined operational settings and wherein said controller unit is operable to compare said sensed operational settings and said predetermined operational settings.

14. The system of claim 13 wherein said screw press juicing apparatus further comprises:
a hopper for receiving fruits;
said precutter, mechanically coupled to said hopper, operable to cut said fruits into small pieces;
said screw press having said front end, said body surface, said rear end, and screw threads that wrap around an outer circumference of said surface of said body and wherein said screw threads has a pitch that is varies along said body surface from said front end to said rear end;
a filter screen, substantially enveloping said screw press inside, having a plurality of openings designed to pass said fruit juice therethrough;
a fruit juice container, mechanically coupled to said filter screen and said screw press, operable to receive said fruit juice that are passed through said filter screen; and
an output section, coupled to said screw press, operable to receive remaining pulps of said fruits.

15. The system of claim 14 wherein said screw press is divided into a collection stage and a juicing stage in accordance with said pitch of said screw threads and a geometrical shape of said body surface, wherein in said collection stage said pitch is lower than that in said juicing stage and wherein said body surface is a concave surface in said collection stage whereas said surface is a straight surface so as said screw press forms a cylindrical shape in said juicing stage.

16. The system of claim 15 wherein said filter screen further comprises circumferential ribs and longitudinal ribs and wherein distances between two consecutive circumferential ribs decreases from said collection stage to said juicing stage.

17. The system of claim 15 wherein said plurality of first elongate heat exchange tubes forms a three-dimensional N×M×L array of first elongate heat exchange tubes, where N is a number of said plurality of first elongate heat exchange tubes arranged in a first direction and M is a number of said plurality of first elongate heat exchange tubes arranged in a second direction, and each of said plurality of first elongate heat exchange tubes has a length L extended in a third direction, wherein said L, M, and N are non-zero integers, and wherein each column of said three-dimensional N×M×L array comprises vertical zig-zag heat exchange tubes formed by said N of said plurality of first elongate heat exchange tubes.

18. The system of claim 17 wherein each of said vertical zig-zag heat exchange tubes are arranged in a horizontally staggered manner and strung together by first curved connecting tubes which alternatively connect two proximate ends and two distal ends of two adjacent said plurality of first elongate heat exchange tubes so that said vertical zig-zag elongate tubes are configured to receive a cold refrigerant gas from said refrigerator unit via said vertical zig-zag tubes located at a bottom row of said N×M×L matrix and to output a warm refrigerant liquid back to said refrigerator unit via said vertical zig-zag tubes located at the bottom row of said N×M×L matrix.

19. The system of claim 18 wherein said convection current condenser unit further comprises a three-dimensional M×N×L array of a plurality of second elongate tubes without fins, wherein said three-dimensional M×N×L array of said plurality of first elongate tubes is fixed on top of said three-dimensional M×N×L array of said plurality of second elongate tubes without fins; wherein each column of said three-dimensional N×M×L array of a plurality of second elongate tubes without fins comprises N of said plurality of second elongate heat exchange tubes without fins arranged in a horizontally staggered manner and strung together by second curved connecting tubes which alternatively connect two consecutive proximate ends and two consecutive distal ends of two adjacent of said plurality of second elongate heat exchange tubes without fins so as to form second vertical zig-zag elongate tubes configured to receive a cold refrigerant gas from said refrigerator unit via said second vertical zig-zag elongate tubes located at a bottom row of said three-dimensional N×M×L array and output a warm refrigerant liquid back to said refrigerator unit via said second vertical zig-zag elongate tubes located at a top row of said three-dimensional N×M array; wherein M equals to 8 and N equals to 12 and wherein each of said plurality of second elongate heat exchange tubes has a length of 30 mm, a radius of 35 mm and a thickness of 3.4 mm.

20. The system of claim 19 wherein each of said plurality of first elongate heat exchange tubes further comprises a cylindrical tube and five rectangular fins arranged around an outer circumference of said cylindrical tube, wherein one of said five rectangular fins is located on top of said cylindrical tube and four rectangular fins are arranged on lateral sides of said cylindrical tube pointing downward so as to prevent ice and water from being collected on said cylindrical tube which is made of an aluminum alloy and has a circumference of 89.9 mm, a radius of 35 mm and a thickness of 3.4 mm and wherein said rectangular fin has a width of 30 mm and a length of 30 mm and a thickness of 4 mm.

* * * * *